(12) United States Patent
Elliott et al.

(10) Patent No.: US 7,765,539 B1
(45) Date of Patent: Jul. 27, 2010

(54) SYSTEM AND METHOD FOR TRANS-COMPILING VIDEO GAMES

(75) Inventors: Scott Elliott, Snoqualmie Pass, WA (US); Phillip R. Hutchinson, Seattle, WA (US)

(73) Assignee: Nintendo Co., Ltd., Kyoto (JP)

( * ) Notice: Subject to any disclaimer, the term of this patent is extended or adjusted under 35 U.S.C. 154(b) by 882 days.

(21) Appl. No.: 11/132,417

(22) Filed: May 19, 2005

Related U.S. Application Data

(60) Provisional application No. 60/572,112, filed on May 19, 2004, provisional application No. 60/655,895, filed on Feb. 25, 2005.

(51) Int. Cl.
*G06F 9/44* (2006.01)
*G06F 9/45* (2006.01)

(52) U.S. Cl. ............... 717/168; 717/145; 717/152; 717/162

(58) Field of Classification Search .......... 717/100, 717/101, 102, 106, 107, 108, 114, 119, 120, 717/121, 122, 136–138, 140–147, 151–154, 717/159, 163–170, 174, 175
See application file for complete search history.

(56) References Cited

U.S. PATENT DOCUMENTS

| | | |
|---|---|---|
| 5,133,072 A | 7/1992 | Buzbee |
| 5,193,190 A | 3/1993 | Janczyn et al. |
| 5,212,794 A | 5/1993 | Pettis et al. |
| 5,396,631 A | 3/1995 | Hayashi et al. |
| 5,507,030 A | 4/1996 | Sites |
| 5,551,039 A | 8/1996 | Weinberg et al. |
| 5,560,013 A | 9/1996 | Scakzi et al. |
| 5,583,983 A | 12/1996 | Schmitter |
| 5,724,590 A | 3/1998 | Goettelmann et al. |
| 5,748,878 A | 5/1998 | Rees et al. |
| 5,768,593 A | 6/1998 | Walters et al. |
| 5,790,825 A * | 8/1998 | Traut ............ 712/209 |
| 5,875,318 A * | 2/1999 | Langford ............ 716/3 |
| 5,966,537 A | 10/1999 | Ravichandran |
| 6,026,240 A | 2/2000 | Subramanian |
| 6,031,992 A | 2/2000 | Cmelik et al. |

(Continued)

FOREIGN PATENT DOCUMENTS

WO    WO 03009135 A2 *  1/2003

OTHER PUBLICATIONS

Cifuentes, C.; The impact of copyright on the development of cutting edge binary reverse engineering technology; Oct. 1999; This paper appears in Reverse Engineering, 1999. Proceedings, Sixth Working Conference; pp. 2-4.*

(Continued)

*Primary Examiner*—Wei Y Zhen
*Assistant Examiner*—Ryan D Coyer
(74) *Attorney, Agent, or Firm*—Nixon & Vanderhye PC

(57) ABSTRACT

A method of porting a video game or other application from one platform to another involves decompiling the game executable to develop source code in a high level programming language such as C. The (re)generated source code is re-linked using target native libraries to handle hardware functions (e.g., video, audio, etc.) for the target platform. The resulting "trans-compiled" executable is able to efficiently run on the target platform, potentially providing orders of magnitude speed performance boost over other traditional techniques.

7 Claims, 13 Drawing Sheets

U.S. PATENT DOCUMENTS

| | | | |
|---|---|---|---|
| 6,035,120 A | 3/2000 | Ravichandran | |
| 6,085,029 A | 7/2000 | Kolawa et al. | |
| 6,115,710 A | 9/2000 | White | |
| 6,161,200 A | 12/2000 | Rees et al. | |
| 6,314,429 B1* | 11/2001 | Simser | 707/103 R |
| 6,490,721 B1 | 12/2002 | Gorshkov et al. | |
| 6,519,768 B1 | 2/2003 | Hughes et al. | |
| 6,526,570 B1 | 2/2003 | Click, Jr. et al. | |
| 6,532,532 B1 | 3/2003 | Eaton et al. | |
| 6,564,373 B1 | 5/2003 | Hughes et al. | |
| 6,658,655 B1 | 12/2003 | Hoogerbrugge et al. | |
| 6,672,963 B1 | 1/2004 | Link | |
| 6,675,374 B2 | 1/2004 | Pieper et al. | |
| 6,675,375 B1 | 1/2004 | Czajkowski | |
| 6,708,325 B2 | 3/2004 | Cooke et al. | |
| 6,728,950 B2 | 4/2004 | Davis et al. | |
| 6,738,967 B1* | 5/2004 | Radigan | 717/146 |
| 6,751,583 B1 | 6/2004 | Clarke et al. | |
| 6,763,327 B1* | 7/2004 | Songer et al. | 703/21 |
| 6,986,128 B2 | 1/2006 | Linden | |
| 2001/0016881 A1* | 8/2001 | Sanchez et al. | 709/328 |
| 2002/0066086 A1* | 5/2002 | Linden | 717/145 |
| 2002/0166112 A1 | 11/2002 | Martin et al. | |
| 2004/0088690 A1* | 5/2004 | Shaul | 717/154 |
| 2004/0111713 A1* | 6/2004 | Rioux | 717/137 |
| 2004/0205728 A1 | 10/2004 | Hanson | |
| 2004/0233203 A1* | 11/2004 | Hill et al. | 345/501 |

OTHER PUBLICATIONS

Cifuentes, C.; The Design of a Resourceable and Retargetable Binary Translator; Oct. 1999; This paper appears in Reverse Engineering, 1999. Proceedings, Sixth Working Conference.*

Blow, Jonathan; "Game Development Harder Than You Think"; ACM Queue; Feb. 2004, p. 29-37.*

Cifuentes, et al., "Walkabout—A Retargetable Dynamic Binary Translation Framework," Sun Microsystems, Palo Alto, CA (Jan. 2002).

Cifuentes, "Interprocedural Data Flow Decompilation," Dept. of Computer Science, University of Tasmania, Australia.

Cifuentes, et al., "Measuring the Cost of Decoding Machine Instructions in Software Hand-crafted vs Automatically generated Decoders,," 10 pages.

Ramsey et al., "New Jersey Machine-Code Toolkit Reference Manual Version 0.5a" (Feb. 20, 2001).

Ramsey et al., "New Jersey Machine-Code Toolkit Architecture Specifications Toolkit Version 0.5a" (Feb. 20, 2001).

"Object Code Translation Home Page," www.ifi.unizh.ch/richter/people/pilz/oct/oct.html, 12 pages (Sep. 15, 1998).

Cifuentes, et al., "Procedure Abstraction Recovery from Binary Code," Dept. of Computer Science & Electrical Engineering, University of Queensland, Australia, 10 pages.

Ramsey, "Relocating Machine Instructions by Currying," University of Virginia, 18 pages.

Cifuentes et al., "UQBT—A Resourceable and Retargetable Binary Translator 1996-2001," www.itee.uq.edu.au, 10 pages.

Cifuentes et al., "Experience in the Design, Implementation and Use of a Retargetable Static Binary Translation Framework," Sun Microsystems, Palo Alto, CA (Jan. 2002).

Ramsey, "A Simple Solver for Linear Equations Containing Nonlinear Operators," Bell Communications Research, Morristown, NJ (Nov. 8, 1996).

Cifuentes et al., "Decompilation of Binary Programs," School of Computing Science, Queensland University of Technology, Australia, 31 pages.

Ramsey, et al., "Specifying Representations of Machine Instructions," *ACM Transactions on Programmin gLanguages and Systems*, vol. 19, No. 3, pp. 492-524 (May 1997).

Sharp, "A Dynamically Recompiling ARM Emulator," 102 pages (2000-2001).

Baxter, "Branch Coverage for Arbitrary Languages Made Easy," Semantic Designs, Inc., Austin, Texas, 6 pages.

Cifuentes, et al., "The Father of Decompilation," IEEE Transactions of Software Engineering (1998).

Ramsey, et al., "The New Jersey Machine-Code Toolkit," 1995 USENIX Technical Conference, New Orleans, LA (Jan. 16-20, 1995).

Cifuentes, et al., "Specifying the Semantics of Machine Instructions," University of Queensland, Australia, Technical Report 422 (Dec. 1997).

Cifuentes, et al., "Assembly to High-Level Translation," University of Queensland, Australia, Technical Report 439 (Aug. 1998).

Van Emmerik, "Signatures for Library Functions in Executable Files," Queensland University of Technology, 8 pages.

Mycroft, "Type-Based Decompilation," Cambridge University, UK, presented at APPSEM'98 Workshop in Pisa.

Visser, "A Survey of Rewriting Strategies in Program Transformation System," University Utrecht, The Netherlands (Draft Feb. 23, 2003).

Cifuentes, et al., "A Methodology for Decompilation," *XIX Conferencia Latinoamericana de Informatica*, Buenos Aires, Argentina, pp. 257-266 (Aug. 2-6, 1993).

Cifuentes, "A Structuring Algorithm for Decompilation," *XIX Conferencia Latinoamericana de Informatica*, Buenos Aires, Argentina, pp. 257-266 (Aug. 2-6, 1993).

Cifuentes, "An Environment for the Reverse Engineering of Executable Programs," University of Tasmania, Australia.

Cifuentes, et al., "Assembly to High-Level Language Translation," University of Queensland, Australia.

Cifuentes, et al., "Binary Translation: Static, Dynamic, Retargetable?".

Boomerang, "Is Decompilation Possible," 2 pages.

Boomerang FAQ (last modified Jul. 27, 2004).

"Boomerang: what needs to be done" (last modified Oct. 5, 2004).

Cifuentes, "Structuring Decompiled Graphs," University of Tasmania, Australia.

Eriksson, "Designing an object-oriented decompiler," Master Thesis in Software Engineering, Thesis No. MSE-2002:17 (Jun. 2002).

Engler, "VCODE: A Retargetable, Extensible, Very Fast Dynamic Code Generation System," *Proceedings of the 23$^{23}$ Annual ACM Conference on Programming Language Design & Implementation*, Philadelphia, PA (May 1996).

Cifuentes, "Reverse Compilation Techniques," Queensland University of Technology (Jul. 1994).

"Program Transformation," http://catamaran.labs.cs.uu.nl, 5 pages (May 2001).

http://www.itee.uq.edu.au/~cristina/students/david/honoursThesis96.

Joel Auslander, Fast, effective dynamic compilation, 1996, ACM Press, pp. 149-159. cited by examiner.

Williams, Compiler technology tracks advances in CPU architectures, Penton's Embedded Systems Development. Aug. 1999. vol. 2, Iss. 8; p. 42 (4 pages).

Ohr, Development tools target hand-coding, Electronic Engineering Times. Manhasset: Apr. 20, 1998. p. 91 (4 pages).

Lee, Java execution a hot topic, Electronic News. New York: Apr. 6, 1998. vol. 44, Iss. 2213; p. 32 (1 page).

Leupers et al., Instruction-set modelling for ASIP code generation, IEEE, Jan. 3-6, 1996 pp. 77-80.

Wess, Automatic instruction code generation based on trellis diagrams, IEEE, May 3-6, 1992 pp. 645-648 vol. 2.

Liem et al., Industrial experience using rule-driven retargetable code generation for multimedia applications, IEEE, Sep. 13-15, 1995 pp. 60-65.

Kreuzer et al., A retargetable optimizing code generator for digital signal processors, IEEE, May 12-15, 1996 pp. 257-260 vol. 2.

* cited by examiner

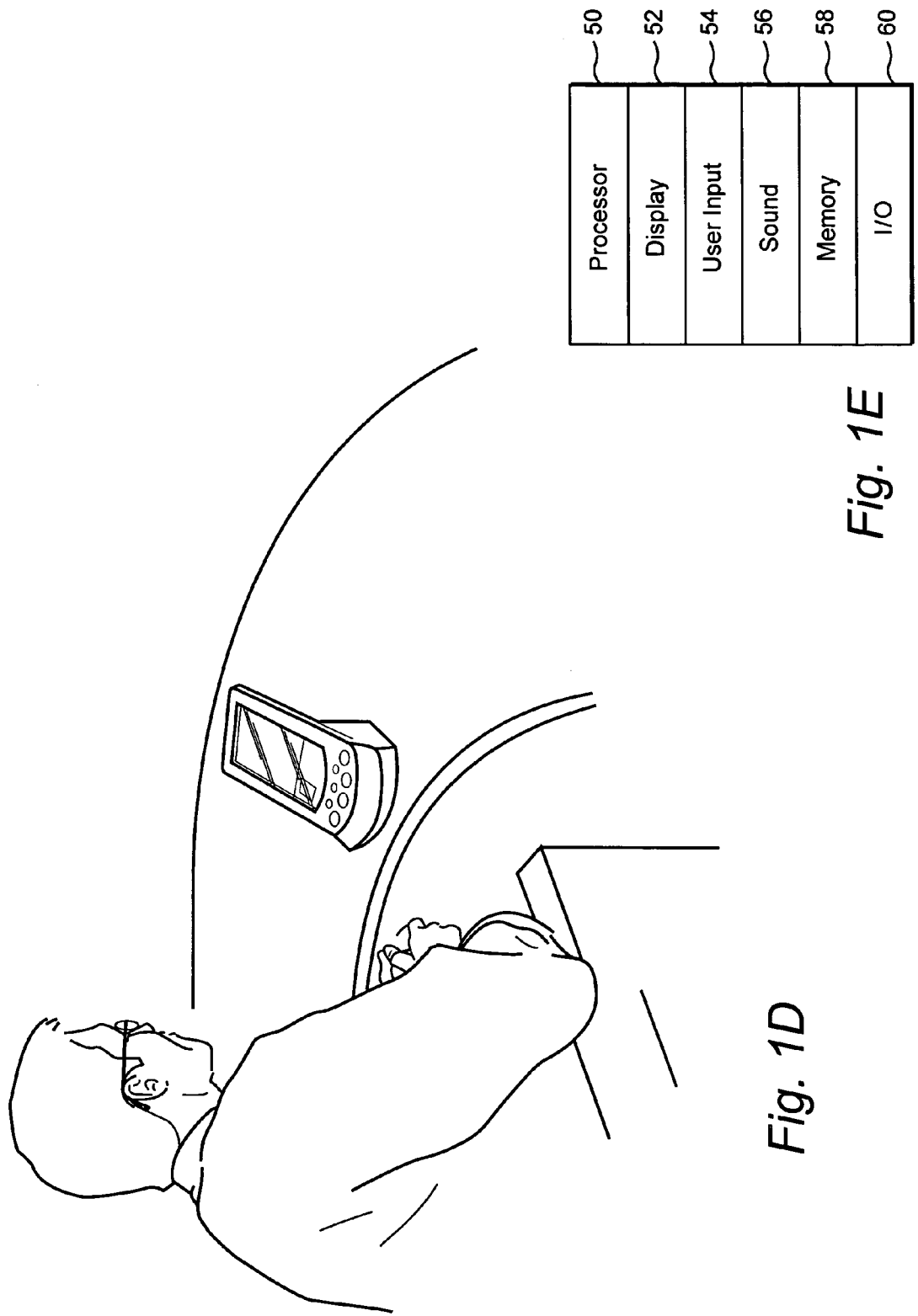

Exemplary Data Flow

Exemplary Tool Chain Components

Exemplary Compiler Statement Translation (real) position := initial + rate * 60 lexical analyzer id1 := id2 + id3 * 60

Syntax analyzer

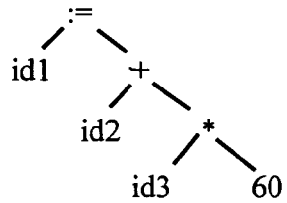

| Symbol Table | |
|---|---|
| 1 position | ... |
| 2 initial | ... |
| 3 rate | ... |
| 4 | |

Semantic analyzer

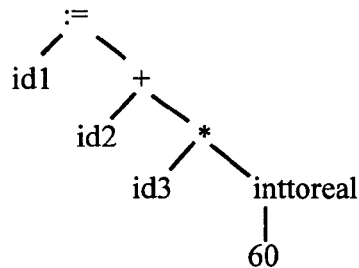

Intermediate Code Generator temp1 := inttoreal(60)
temp2 := id3 * temp1
temp3 := id2 + temp2
id1   := temp3

Code Optimizer temp1 := id3 * 60
id1   := id2 + temp1

Code Generator

MOVF  id3,   R2
MUL   #60.0, R2
MOVF  id2,   R1
ADDF  R2,    R1
MOVF  R1,    id1

*Fig. 9*

Exemplary Illustrative Compiler Statement Translation

Exemplary More Detailed Data Flow

Exemplary Illustrative High Level View of Translation

Exemplary Flow Graph Before Optimization

Exemplary Flow Graph After Code Optimization

SYSTEM AND METHOD FOR TRANS-COMPILING VIDEO GAMES

CROSS-REFERENCES TO RELATED APPLICATIONS

This application claims priority from commonly-assigned provisional application No. 60/572,112 filed 19 May 2004 entitled "System and Method for Trans-Compiling Video Games" and from commonly-assigned provisional application No. 60/655,895 filed 25 Feb. 2005 entitled "System and Method for Trans-Compiling Video Games", the entire disclosures including the drawings of which are hereby fully incorporated herein by reference as if expressly set forth.

STATEMENT REGARDING FEDERALLY SPONSORED RESEARCH OR DEVELOPMENT

Not applicable.

FIELD

The technology herein relates to video games, and more particularly to techniques for allowing video games to run on various different platforms. The technology herein also relates to solutions for the controlled translation of game object code to new and/or different platforms, and to translation utility tools, systems and techniques for providing such solutions. In still more detail, the technology herein relates to systems and methods for trans-compiling video game and other software so it can run efficiently on a platform other than the one it was originally intended and/or written for.

BACKGROUND AND SUMMARY

Nintendo's GAME BOY® hand-held and home video game platforms have been extraordinarily successful. Nintendo released its first Nintendo Entertainment System home video game console in the early 1980's and released the first GAME BOY® in the late 1980s. Since then, this product and its successors (Super Nintendo Entertainment System, Nintendo 64, Nintendo GameCube System, GAME BOY COLOR®, GAME BOY ADVANCE®, Nintendo DS, and other systems) have captured the imaginations of millions of video game players throughout the world.

A wide number of different software applications (including but not limited to video games) have been designed to run on these various platforms. People throughout the world enjoy these applications every day. One can see them being used at home, on subways, at sports arenas, after school, and in a number of other contexts. See FIG. 1A to see someone playing an exemplary handheld Nintendo video game platform.

Nintendo's gaming platforms are examples of platforms having specialized hardware that is optimized for low cost, excellent performance and good graphics. In general, these devices are not really general purpose computers—they are special-purpose devices with specialized capabilities particularly adapted and often optimized to video game play. These special capabilities provide low cost and exciting video game play action with great graphics and sound to enhance the game playing experience.

More recently, handheld and portable computing devices are exploding in popularity. Cellular telephones now come with color displays and powerful processors and graphics accelerators that can perform complex imaging and computing functions including video game play. Handheld personal digital assistants (PDAs) have become increasingly sophisticated and capable with powerful processors, substantial amounts of memory resources, and some interesting graphics and display capabilities (some now even have graphics processors). Portable pocket personal computers provide as much hardware horsepower and computer graphics capabilities as desktop computers of only a few years ago. Gaming platforms such as home consoles and handheld video game systems are also being increasingly sophisticated, flexible and capable, and include additional capabilities such as touch screen (Nintendo DS), wireless communications (Nintendo DS, Nintendo Revolution), networked gaming, downloadable FLASH memory (Nintendo Revolution) and other features.

Convergence of these various technologies has led to multipurpose devices that can perform a variety of different functions. For example, cellular telephones can also perform functions of the type that pocket PCs and/or personal digital assistants have been performing for some time. The wireless networking capabilities of such convergence platforms offer interesting possibilities for networked, head-to-head or other video game play.

All of these hardware and platform innovations demonstrate that software content is perhaps the most important indicia of success. Just as television viewers are likely to be more interested in the particular TV programs they watch than in the type of television they watch them on, many video game players are likely to be more interested in the particular games they wish to play than in the hardware platforms and technology used to play those games. These market forces create an increasing need for efficient, cost-effective ways to take video games and other software written for one platform and permit them to be played on other platforms.

While the GAME BOY® platforms are inexpensive and have long battery life, there may be situations in which it would be desirable to play or use applications developed for one platform (e.g., GAME BOY®, NES, SNES, AGB, etc.) on such other platforms such as:

other, non-native video game platforms
cell phones
personal digital assistants (PDAs)
pocket PCs
set top boxes
personal computers, laptop computers, workstations
automobile-mounted entertainment systems
airline, train and boat entertainment systems
smart telephones
portable music players
portable radios, stereos, etc.
wearable electronic appliances
credit card sized computers
any electronic appliance with a microprocessor and a display
any other computing systems with or without specialized graphics hardware.

As one example, an airline, train or other vehicle passenger might want to play video games during a long journey. As shown in FIG. 1B, airlines are installing seat-back computer displays into the backs of airline seats. Such seat-back displays often provide a low cost personal computer including a processor, random access memory, liquid crystal display and input device(s). Similar displays could be installed in other vehicles (e.g., trains, ships, vans, cars, etc.) or in other contexts (e.g., at walk-up kiosks, in hotel rooms, etc.). It would be desirable under certain circumstances to allow users to execute all sorts of different applications including GAME BOY®, GAME BOY COLOR® and GAME BOY ADVANCE® video games and other applications using the general-purpose computer capabilities of such seat-back or similar display devices.

Personal computers (desktop, laptop and portable) have proliferated throughout the world and are now available at relatively low cost. One trend has shifted some entertainment from the home television set to the home personal computer, where children and adults can view interesting web pages and play downloaded video games, music, videos and other content. In some circumstances, it may be desirable to allow users to play GAME BOY®, GAME BOY COLOR® and GAME BOY ADVANCE® video games on their personal computers (see FIG. 1C).

A wide variety of so-called personal digital assistants (PDA's) have become available in recent years (see FIG. 1D). Such devices now comprise an entire miniature computer within a package small enough to fit into your pocket. Mobile cellular telephones are also becoming increasingly computationally-intensive and have better displays so they can access the World Wide Web and perform a variety of downloaded applications. Such devices as cell phones, PDAs, pocket PCs and the like may, for example, include a processor 50, a display 52, user input device(s) 54, sound generation 56, memory 58, input/output 60, and other capabilities including wireless communications. In some circumstances, it may be desirable to allow people to play GAME BOY®, GAME BOY COLOR® and GAME BOY ADVANCE® video games and other GAME BOY®, GAME BOY COLOR® and GAME BOY ADVANCE® applications on a personal digital assistant, cellular telephone or other such device.

It may also be desirable to allow video games written for one video game platform to play on another video game platform. For example, games written for the Nintendo Entertainment System, the Super Nintendo Entertainment System and the Nintendo 64 are fun and continue to have a very wide following. It might be desirable to play such games on newer video game hardware platforms such as for example the Nintendo Revolution system or the Nintendo GameCube System.

In one particular illustrative non-limiting example, the same special-purpose sound and graphics circuitry provided by the GAME BOY® and other video game platforms is not generally found in the various other platforms. Providing these missing capabilities is one of the challenges to running a GAME BOY®, GAME BOY COLOR® and GAME BOY ADVANCE® video game (or other GAME BOY®, GAME BOY COLOR® and GAME BOY ADVANCE® application) or other video game platform software on these other target platforms.

Another challenge relates to instruction set compatibility. For example, in one particular illustrative context, Nintendo's GAME BOY® is based on an older, relatively inexpensive microprocessor (the Zilog Z80) that is no longer being used in most modern general purpose computer systems such as personal computers, seat-back displays, cell phones and personal digital assistants. The Z80 instruction set (the language in which all GAME BOY® games and other GAME BOY® applications are written in) is not directly understood by modern Intel microprocessors (e.g., the 8086, 80286, 80386, Pentium and other processors in the Intel family) that are now widely used and found in most personal computers, seat-back displays, personal digital assistants, cell phones, and the like. Similarly, the ARM processor that the GAME BOY ADVANCE® product uses is not universally used. Other video game platforms use other processors that may not be widely available in cross-platform contexts. These compatibility issues provide challenges that it would be desirable to overcome in developing successful cross-platform gaming experiences.

One way to provide a cross-platform capability is to provide a software "emulator" on the target platform. See for example U.S. Pat. No. 6,672,963. Generally, a software emulator is a computer program that executes on a desired target platform (e.g., a seat-back display device, a personal computer, a personal digital assistant, a cell phone, a different video game platform, etc. as shown in FIGS. 1B-1D). The emulator software supplies at least some capabilities needed to run the game but which are missing from the target platform. As one non-limiting example, a software emulator may perform some or all of GAME BOY®'s specialized graphics functions in software, and may interface with whatever graphics resources are available on the target platform to display resulting images. A software emulator may translate or interpret ARM instructions so the microprocessor of the target platform can perform the functions that GAME BOY ADVANCE® would perform if presented with the same instructions. The software emulator may include software code that emulates or simulates hardware capabilities within the GAME BOY ADVANCE® circuitry (e.g., audio and/or graphics processing) and/or translate associated GAME BOY ADVANCE® application requests into requests that can be handled by the hardware resources available on the target platform. For example, the target platform may include a graphics adapter and associated display that is incompatible with GAME BOY ADVANCE®'s graphics hardware but which can perform some of the basic graphics functions required to display GAME BOY ADVANCE® graphics on a display. Emulators, in general, do not exactly emulate or duplicate the functionality of the original platform, but the functionality they provide is often "close enough" to provide a satisfying end user game playing experience.

A number of GAME BOY® and GAME BOY ADVANCE® emulators have been written for a variety of different platforms ranging from personal digital assistants to cell phones to personal computers. However, one area of needed improvement relates to obtaining acceptable speed performance and high quality sound and graphics on a lower-capability platform. A lower-capability platform (e.g., a seat-back display, a personal digital assistant or a cell phone) may not have enough processing power to readily provide acceptable speed performance. The target platform generally needs to run the emulator software as well as the game software, meaning that it has to, in a sense, do "double duty." Unless the software emulator is carefully designed and carefully optimized, it may not be able to maintain real time speed performance when running on a slower or less highly capable processor. Slow-downs in game performance are generally unacceptable if the average user can notice them since they immediately affect and degrade the fun and excitement of the game playing experience.

Performance problems are exacerbated by the penchant of some video game developers to squeeze the last bit of performance out of the video game platform. Performance tricks and optimizations within a game application may place additional demands on any emulator running the application. Some emulators provide acceptable results when running certain games but unacceptable results (or do not work at all) for other games. An ideal solution provides acceptable results across a wide range of different games and other applications such that the target platform can run many games or other applications developed for the original platform.

Another challenge to good design relates to maintaining excellent image and sound quality. Ideally, the target platform should be able to produce graphic displays that are nearly the same quality as those that would be seen on the original platform. Additionally, the color rendition and other aspects of the image should be nearly if not exactly the same. Sounds (e.g., music and speech) should have at least the same quality as would be heard on the original platform. All of these capabilities should be relatively closely matched even on platforms with radically different sound and graphics hardware capabilities.

"Porting" is another common approach to provide cross-platform game playing capabilities. Many or most third party video game software developers are intensely interested in porting since it allows their games to run a variety of different platforms and thus increases potential sales. Video game hardware platform developers may also be interested in porting technology because porting can increase the library of games that are able to run on any particular platform. For example, if a particular game has become a hit on one platform, there may be interest in porting that game to other platforms as well. End users can benefit in some cases because they are able to play a particular game on the platform they have invested in without having to buy or borrow a different platform to play that game.

The technology herein provides new "porting" and/or other techniques for "trans-compiling" a video game written for one platform so that the resulting code can run on a different platform.

In one exemplary illustrative non-limiting implementation, a video game originally written for a portable dedicated video game hardware platform such as for example Nintendo's GAME BOY ADVANCE® platform can be "trans-compiled" so that it can be stored on a storage medium and played on a different platform such as a Palm Operating System based mobile and/or wireless computing device, a computing or video game device with a different (e.g., Intel-based) microprocessor or some other platform.

Briefly, in one exemplary illustrative non-limiting implementation, the binary executable code for the video game (i.e., the so-called "ROM" in Internet parlance) is decompiled to (re)generate source code. Such decompilation in one exemplary illustrative non-limiting implementation (re)generates the source code in a high level language such as C. The decompiled source code is then processed to eliminate unnecessary (e.g., hardware specific) libraries and functionality. The resulting modified source code is then recompiled and re-linked with libraries native to the target platform that are used to handle hardware functions such as video, audio, input, output, etc.

In one exemplary illustrative non-limiting implementation, the recompilation process links in libraries that remap hardware functions supplied by the original platform to new function calls for the specific target platform. The resulting recompiled game or other application can run at very high speed on the desired target platform (e.g., personal computer, Palm OS, other video game platform, or any other computing platform).

The techniques may, under some circumstances, provide well over an order of magnitude speed performance boost (e.g., ten to one hundred times faster performance) over prior traditional emulator approaches. The technology may allow games to be played on much lower cost/performance platforms than has generally previously been possible.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 1B-1D show various different target platforms that could be used to emulate the FIG. 1 GAME BOY®;

FIG. 1E shows an example platform block diagram;

FIG. 9 shows an exemplary illustrative non-limiting compiler statement translation;

DETAILED DESCRIPTION

Figure 1A:
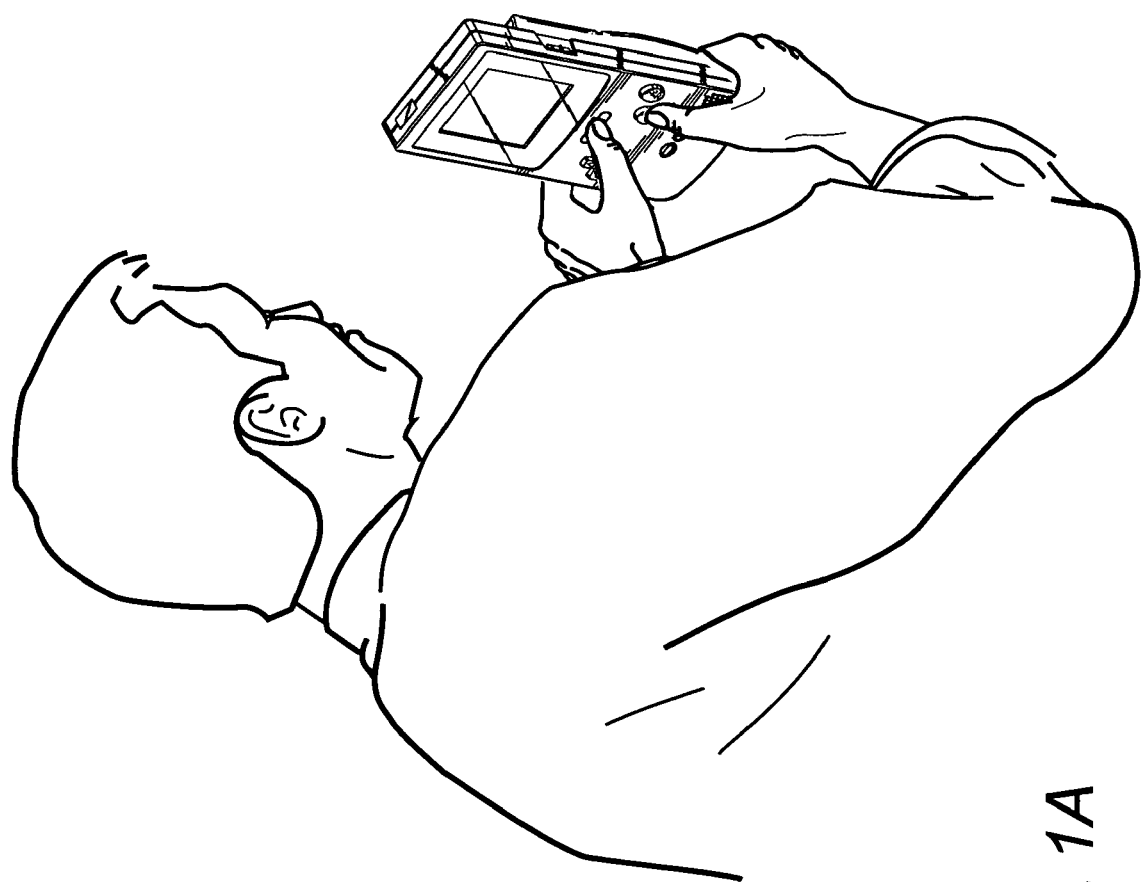
FIG. 1A shows someone playing a Nintendo GAME BOY® portable video game platform.
Figure 1B:
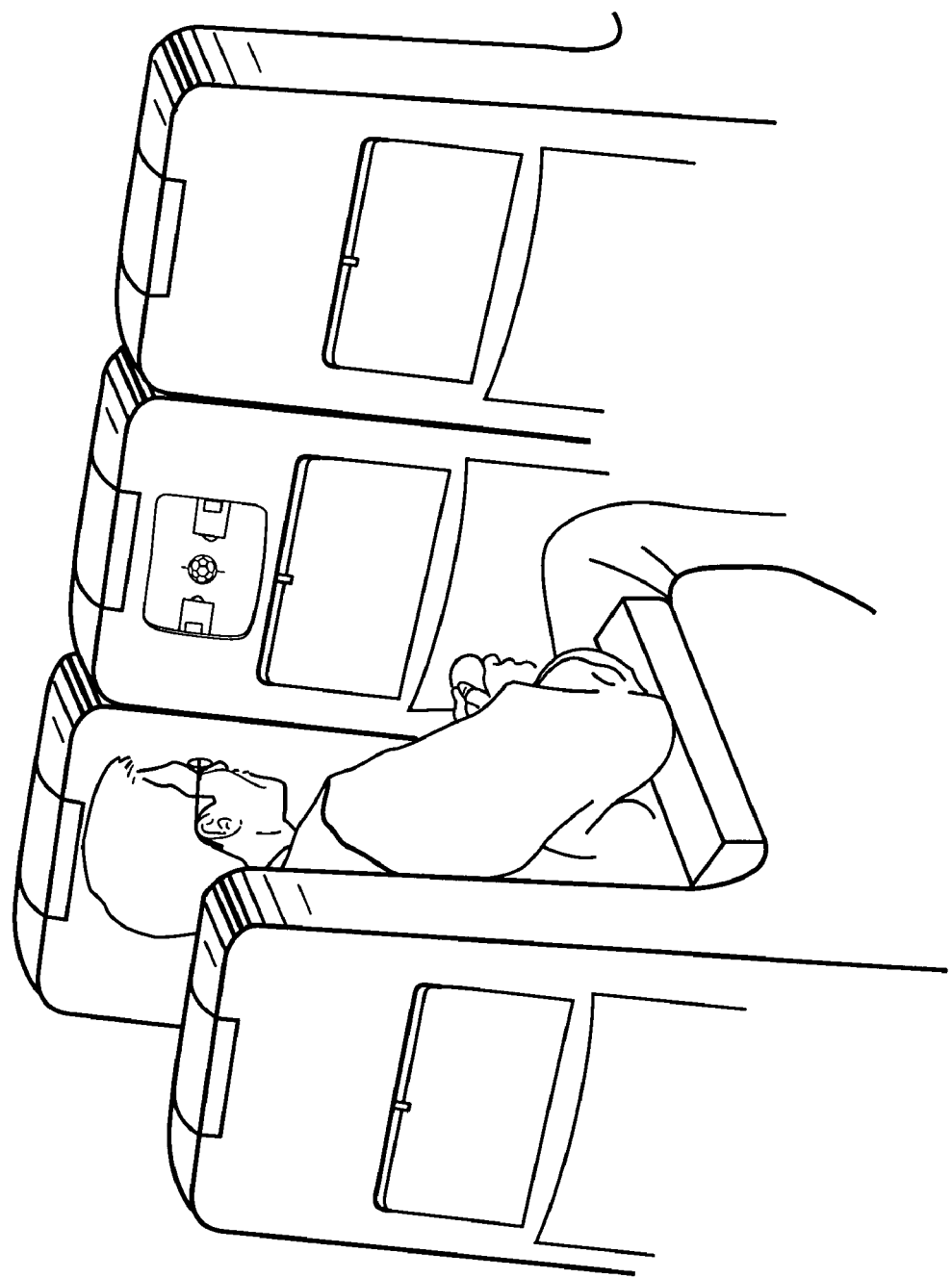
Figure 1C:
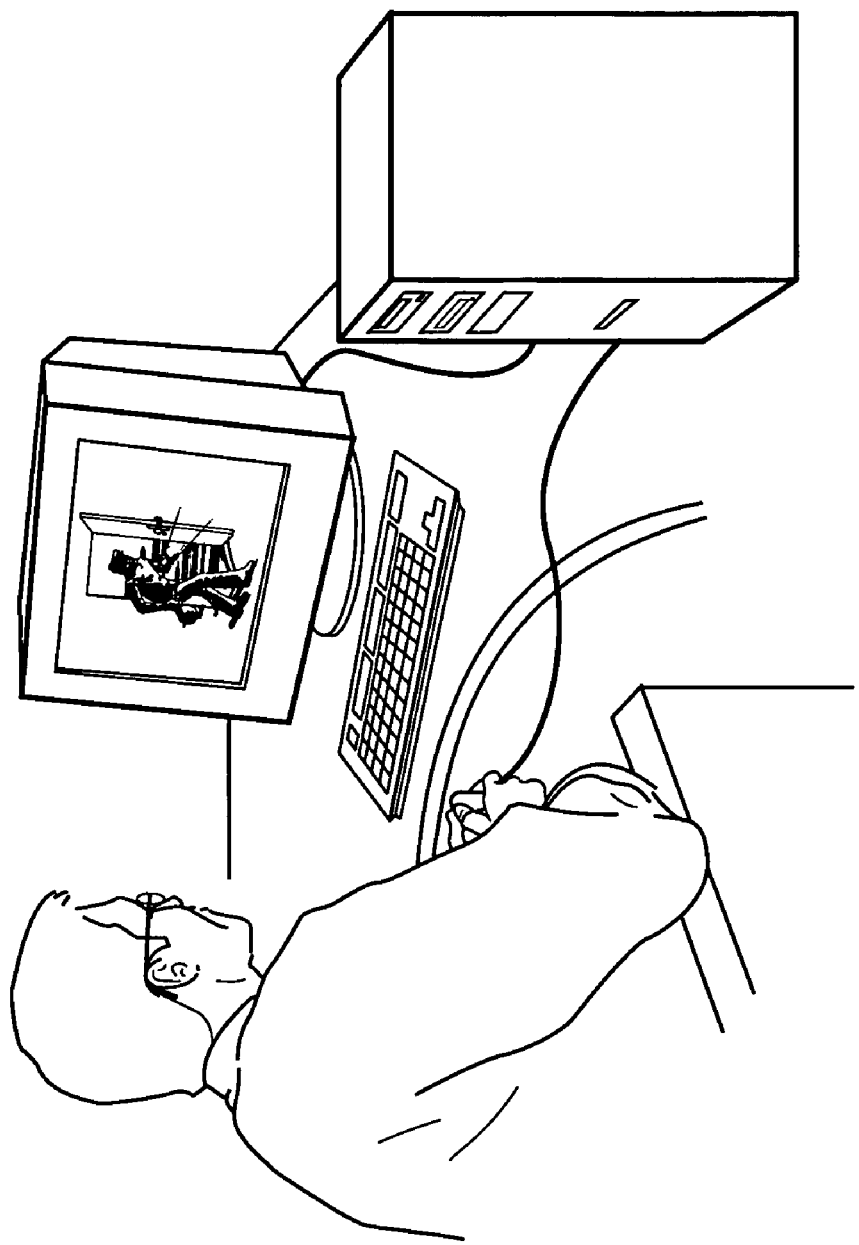
Figure 2:
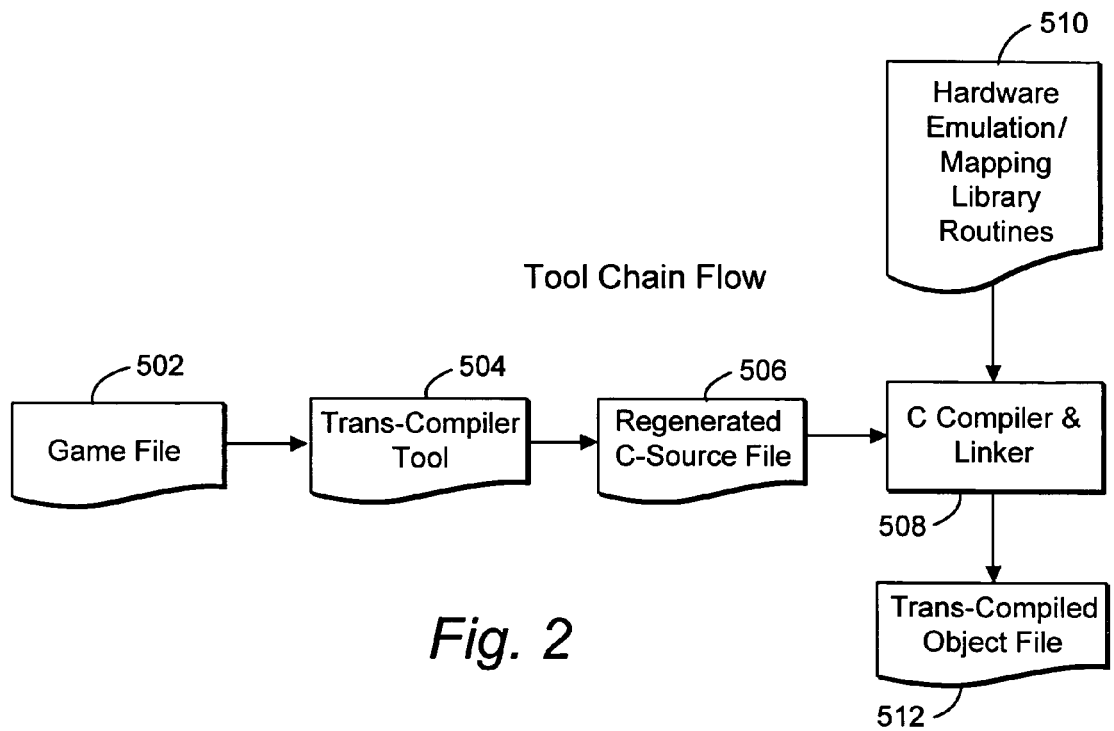
FIG. 2 shows exemplary illustrative non-limiting flowchart.
Figure 6:
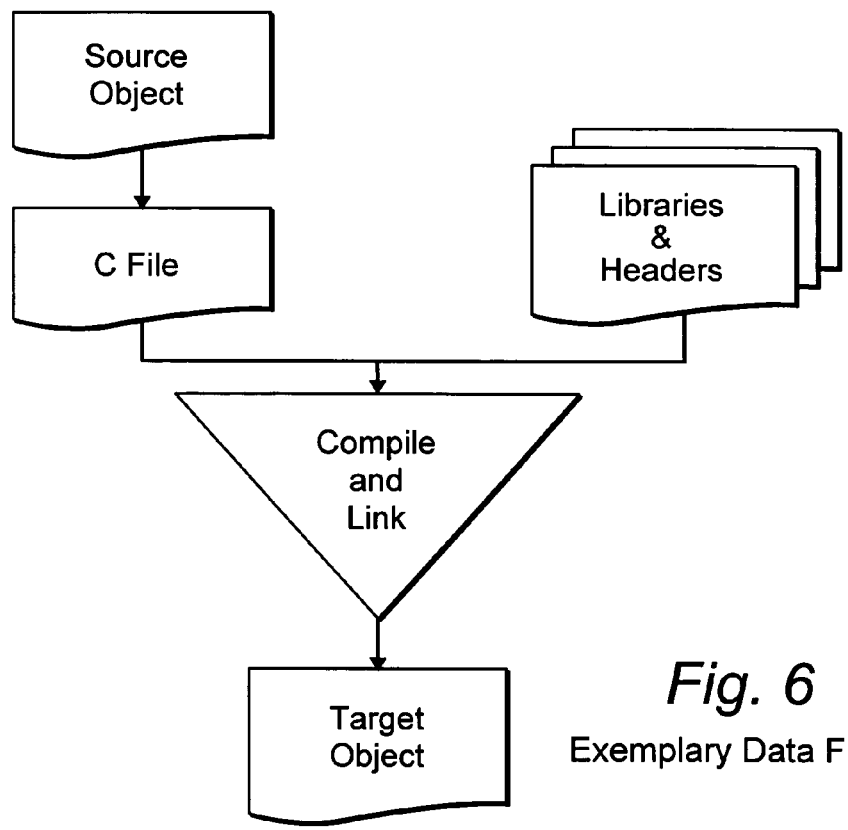
FIG. 6 shows an exemplary additional data flow illustration.

FIGS. 2 and 6 show an exemplary illustrative non-limiting implementations of trans-compilation systems and methods. In these exemplary illustrative non-limiting implementations, a software executable 502 (e.g., a "source file") such as a video game file ("ROM") in binary format executable on one platform is "trans-compiled" so it can run on a different platform. A trans-compiler tool 504 is used in the exemplary illustrative non-limiting example to decompile the binary executable to provide source code in a convenient higher level language such as C, C++, JAVA, etc. The (re)generated C source file 506 is then compiled and linked using libraries and headers and a standard conventional optimizing compiler/linker 508 to provide a new executable "target object" for the target platform.

The illustrative non-limiting implementation shown in FIGS. 2 and 6 can be used to translate existing game objects to new target platforms. The tool 504 reads standard game ROM files and produces a standard "C" language file representation of the original game code. This C file is then compiled and linked using GCC with header, standard library and special abstraction layer files to create a new executable object for a target platform. Tool 504 extends traditional compiler technology to support object code translation, thus for example providing a system that can execute on very restricted target platforms without any loss in performance. Unlike at least some emulator contexts, exemplary illustrative tool 504 creates one new executable object for each original executable object.

The C compiler and linker 508 may compile and/or link the source code with hardware emulation/mapping library routines 510 designed or written for the particular target platform. Such library routines 510 may, for example, simulate, emulate and/or "stub" certain functions available on the original platform that are not available on the new target platform (e.g., graphics capabilities such as 3D effects, rotation, scaling, texture mapping, blending, or any of a variety of other graphics related functionality, audio functionality such as sound generation based on proprietary sound formats, etc.). The resulting trans-compiled object file 512 is stored in some type of storage medium (e.g., an SDRAM card, memory stick, internal RAM, Flash memory, etc.) to be efficiently run on the target platform to provide a satisfying and interesting game play experience.

Figure 3:
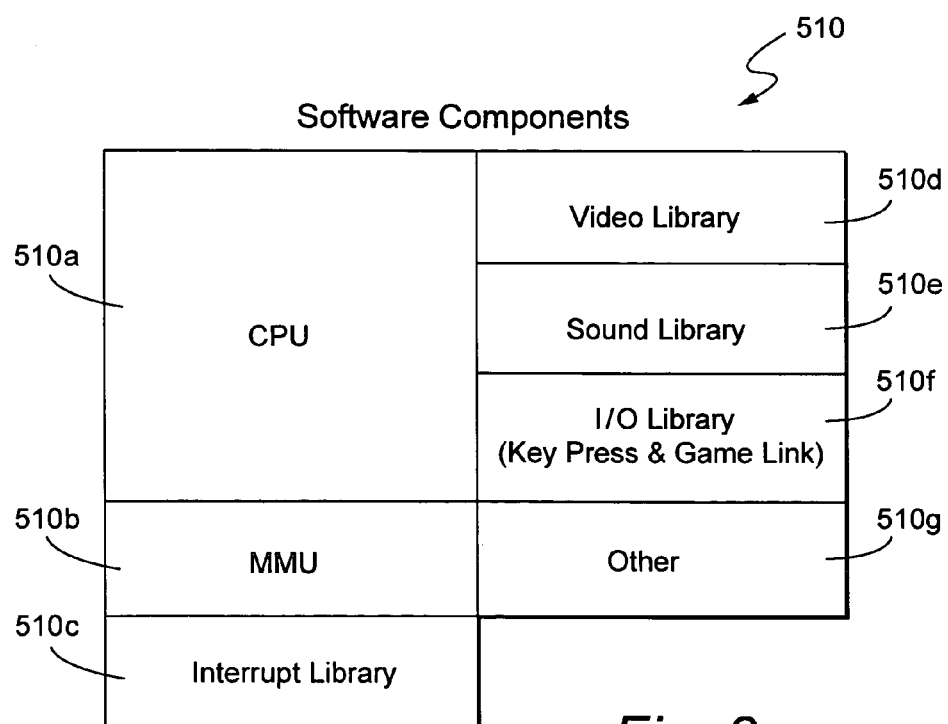
FIG. 3 shows exemplary illustrative non-limiting software components.

FIG. 3 shows a view of exemplary software components of library routines 510. Such software components may include, for example:

CPU libraries 510*a*,
memory management unit libraries 510*b*,
interrupt libraries 510*c*,
video library 510*d*,
sound library 510*e*,
I/O library 510*f*; and
other libraries 510*g*.

In the exemplary illustrative non-limiting example shown, the CPU library 510*a* provides functionality needed to allow the target CPU (which may be different from the original CPU) to run the game software or other application. In some cases, the target platform may have the same CPU as the original platform. In such cases, the CPU library 510*a* may not need to include detailed CPU cross-platform functionality. In other cases, where the CPU of the target platform is different than the CPU from the source platform, the CPU library 510*a* may need to provide certain functionality to allow the decompiled source code once recompiled and linked to run on the target platform. CPU library 510*a* may also contain a variety of different functions that the target platform uses to support the game application (e.g., original platform CPU runtime libraries that have been (re)written to optimize performance on the target platform).

The exemplary memory management unit library 510*b* shown in FIG. 3 includes functions used to manage the actual, virtual and/or emulated memory provided by the target platform. The original platform for which the game or other application was written may include a particular memory architecture that the game or other application expects, takes advantage of and/or is otherwise customized for. In some cases, such memory management functionality may need to be emulated or simulated on the target platform. In other cases, the memory management functionality may be stripped out from the (re)generated source code and replaced with new memory management functionality optimized specifically for the target platform while still meeting requirements of the game.

In the exemplary illustrative non-limiting implementation, interrupt library 510*c* may be used to provide interrupt capabilities and support (see also discussion below on software interrupt capabilities). The original platform in general is likely to contain some type of interrupt structure and functionality (e.g., interrupt vectors, interrupt handlers, interrupt registers and associated priority, etc.) that may need to be emulated or otherwise provided on the target platform. Additionally, the target platform in general may contain an interrupt capability that the trans-compilation process desirably takes advantage of to provide high efficiency operation. As is well know, such interrupt capabilities allow for efficient handling of input, output, timing and other events without the need for extensive polling and other associated functionality.

In the exemplary illustrative non-limiting implementation, video library 510*d* is used to provide graphics support on the target platform. For example, video library 510*d* may support color graphics generation including 2D and 3D effects such as for example rotation, scaling, character-based or bit mapped graphics, hidden surface removal, foreground/background prioritization, texture mapping, shading, etc. Sound library 510*e* similarly provides sound generation functionality such as for example playback of .WAV, MIDI or other sound file formats, sound generation based on proprietary sound representation formats, etc. In the exemplary illustrative non-limiting implementation, video library 510*d* and sound library 510*e* may provide functionality specific to the target platform based upon the target platform's graphics and sound generation capabilities. Necessary functionality provided by the original platform that is not available on the target platform may be emulated, simulated or otherwise handled to provide acceptable video game and/or other application execution.

The I/O library 510*f* in the exemplary illustrative non-limiting implementation handles input and output functionality on the target platform. Typically, the user input devices available on the original platform are not identical to those present on the target platform, so I/O library 510*f* provides input control remapping (which may be user customizable in some instances) to take differences into account. The I/O library 510*f* may allow the trans-compiled video game or other application to communicate with a variety of other devices including for example memory cards, wireless adapters, infrared communication, head-to-head "game link" wired communication between devices, etc.

Other libraries 510*g* may be included to provide any additional functionality desired on the target platform.

FIG. 6 provides an additional, more detailed exemplary view of the exemplary tool's software components and architecture (in this diagram, "NATSU" may refer to tool 504). In the example shown, main or principal components include:

a tool chain for generating the transcompiler;
the transcompiler 504 itself;
abstraction layer libraries;
standard C libraries and headers; and
GCC built for the target tool environment.

In one exemplary illustrative implementation, the components used to generate the tool 504 include a compiler ("GCC") built for the target tool environment (e.g., x86), the New Jersey Machine Code Toolkit; the Syntax description OCHA file in SLED format; the NJMCT generated parser C code file; and an open-source or other "decompiler" tool for controlled translation of object code into a C representation of that object code.

In the exemplary implementation shown, the tool 504 uses the original object ROM file (e.g., as previously prepared for distribution and execution on original native target platforms). The tool 504 generates various files including a decompiled C or other high level source file representing the original object code; a symbol file; and error/log file; and various header files.

The exemplary GCC compiler takes as its input the C or other decompiled high level source file generated by tool 504 representing the original object code. It may also use the tool-generated symbol file, the too-generated header files, and other convention input files such as UMAI Peripheral Abstraction Layer libraries, standard C libraries and standard C headers for the target CPU/OS of the target platform.

Figure 4:
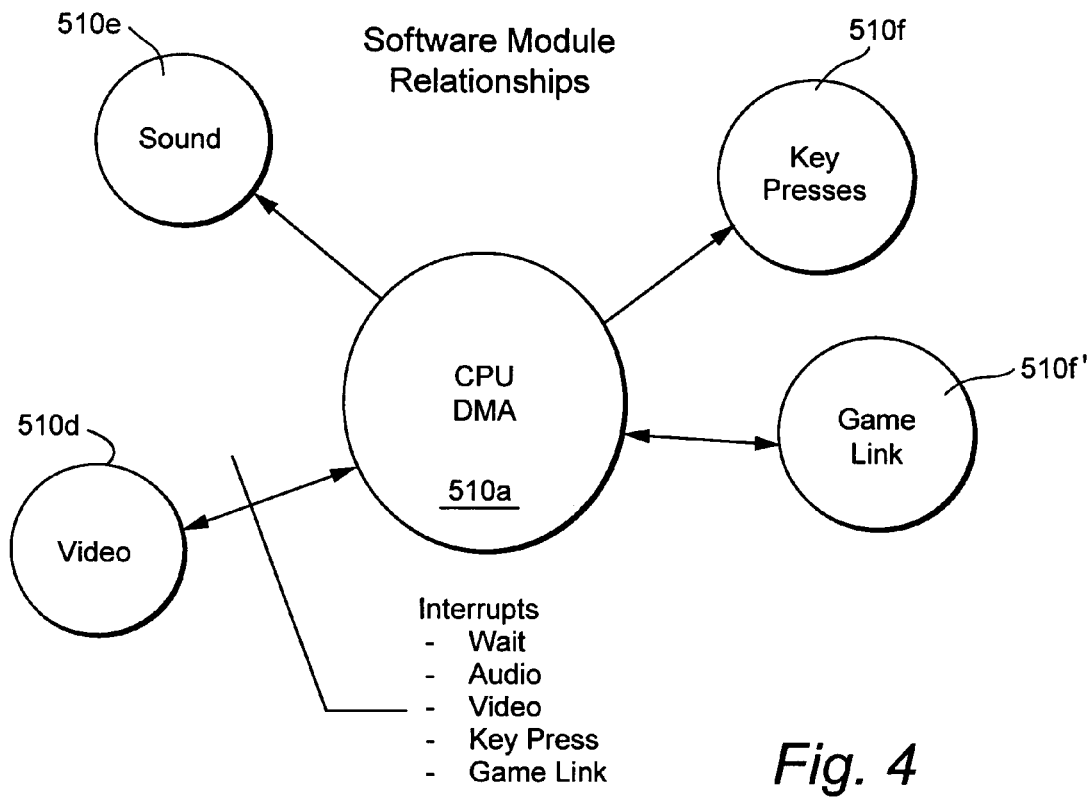
FIG. 4 shows exemplary illustrative non-limiting software module relationships.

As shown in FIG. 4, the different software modules shown in FIG. 2 may interact with one another in complex ways. For example, the CPU and/or MMU libraries 510*a*, 510*b* may each or both interact with the sound functionality provided by sound library 510*e*, the video functionality provided by video library 510*d*, and the user input or other (e.g., wired or wireless "game link" networking) functionality provided by I/O library 510*f*.

Figure 5:
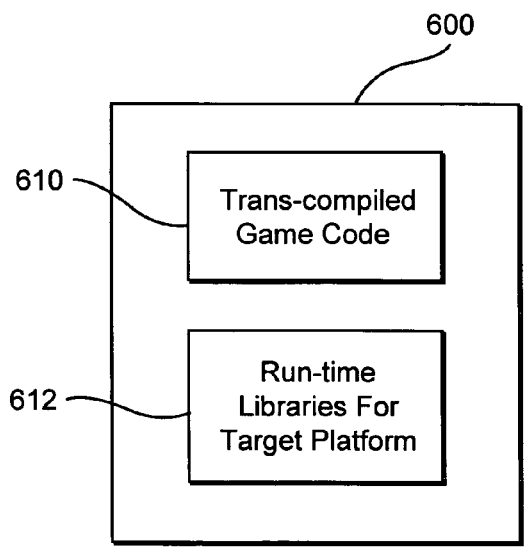
FIG. 5 shows an example storage medium.

FIG. 5 shows an example non-limiting storage medium 600 compatible with the target platform. The storage medium stores trans-compiled game code 610 and linked run-time libraries 612 native to the target platform.

Exemplary Compilation and Linking Process

Figure 8:
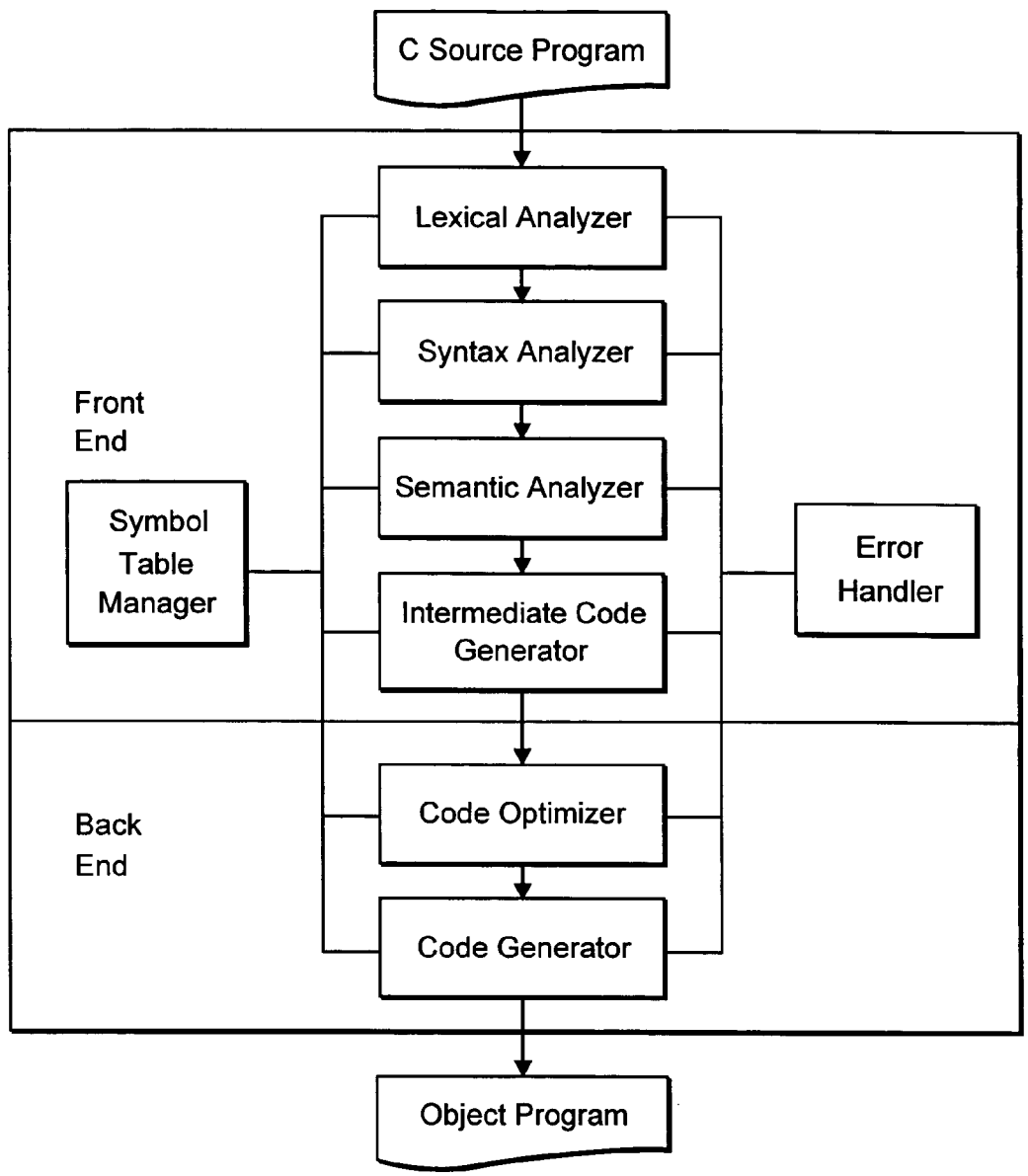
FIG. 8 shows an exemplary illustrative non-limiting compiler statement translation.

In more detail, FIGS. 8 and 9 show that an exemplary compilation process performed by compiler/linker 508 may use many of the same strategies as modern compilers. Such exemplary techniques include for example lexical analysis, syntax analysis, semantic analysis, intermediate code generation, code optimization, code generation, etc. The compilation/linking process may for example use a symbol table manager and an error handler as shown in FIG. 8. FIG. 9 shows an exemplary compiler statement translation through these various phases of compilation and linking.

Exemplary Decompilation Process

One exemplary illustrative trans-compiler tool 504 implementation is based on a conventional open-source tool such as "Boomerang" for the controlled translation of object code into a C representation of that object code. Such a tool can work by the iterative abstraction of machine code to an internal abstract register transfer language and then into a C code representation of the original object code. The final C code is intended to be Turning Equivalent to the original C source code that the programmer originally created the original object code from. See for example http://boomerang.source-forge.net/ (website incorporated herein by reference) for additional information Note that source code output of transcompiler tool 504 is generally not identical to the original source code written by the software developer. For example, any comments the original programmer wrote will not be present in the decompiled output of tool 504. In addition, a very large number of different variations of a hypothetical source code may all upon compilation produce the same object code. This is why the transcompiler tool 504 output is considered to be a Turning Equivalent (but not necessarily identical to) the original source code. We have found that there are advantages to conducting this process without using the actual original source code. Often, the original source code is no longer available or may not be available to the developers of the transcompiled code. In addition, there may be some advantage to working from decompiled source code as opposed to original source code even if the original source code is available.

Tables 1-3 below show exemplary comparisons between original source codes and decompiled source codes using tool 504. These examples show that the resulting source codes are fairly readable and compile with no fatal errors and run correctly. For example, Table I illustrates features such as conversion of stack locations to local variables; detection, declaration use and initialization of arrays, correct handling of C strings through rough use of the string as a parameter to a library function, and replacement of a pretested "while" loop with a post-tested "do while" loop that are functionally equivalent.

TABLE 1 test/pentium/summary:

| Original source code | Decompiled source code |
|---|---|
| #include <stdio.h><br>int a[10] = {1, 2, 3, 4, 5, 6, 7, 8, 9, 10};<br><br>int main( ) { | int a[10] = {1, 2, 3, 4, 5, 6, 7, 8, 9, 10<br>};<br>char* global1 = "Sum is %d\n";<br>int main(int argc, char** argv, char** |

TABLE 1-continued test/pentium/summary:

| Original source code | Decompiled source code |
|---|---|
| int sum = 0;<br>int i;<br><br><br><br>for (i=0; i < 10; i++) {<br>sum += a[i];<br><br><br>}<br>printf("Sum is %d\n", sum);<br>return 0;<br>} | envp)<br>{<br>int local1; // m[r28{0} − 8] // sum<br>int local2; // m[r28{0} − 12] // i<br>local1 = 0;<br>local2 = 0;<br>while (local2 <= 9) {<br>local1 += a[local2]; // sum += a[i]<br>local2++; // i++<br>}<br>L3:<br>}<br>printf("Sum is %d\n", local1);<br>return 0;<br>} |

TABLE 2 test/pentium/fibo-O4:

| Original source code | Decompiled source code |
|---|---|
| #include <stdio.h><br><br><br><br>int main (void)<br>{ int number, value;<br><br><br><br><br>printf ("Input number: ");<br>scanf ("%d", &number);<br>value = fib(number);<br><br><br><br><br><br><br><br><br><br>printf("fibonacci(%d) =<br>%d\n", number,<br>value);<br>return (0);<br>}<br><br>int fib (int x)<br>{<br>if (x > 1)<br>return (fib(x − 1) +<br>fib(x − 2));<br>else return (x);<br>} | char* global0 = "Input number: ";<br>char global1[0];<br>char* global2 = "fibonacci(%d) =<br>%d\n";<br>int main(int argc, char** argv, char** envp)<br>{<br>int local10; // r24 // value<br>int local7; // m[r28{0} − 8] // Local7<br>int local8; // r24{39}<br>int local9; // r28<br>printf("Input number: ");<br>scanf("%d", local9 − 8); // Error: should be<br>&local7<br>// The compiler inlined the call to fib<br>if (local7 <= 1) {<br>local10 = local7;<br>} else {<br>local8 = fib(local7 − 1);<br>local10 = fib(local7 − 2);<br>local10 = local10 + local8;<br>}<br>printf("fibonacci(%d) = %d\n", local7,<br>local10);<br><br>return 0;<br>}<br><br>int fib(int param1)<br>{<br>int local6; // r24{18}<br>int local7; // r24 // Return value (was eax)<br>if (param1 <= 1) {<br>local7 = param1; // ret = x<br>} else {<br>local6 = fib(param1 − 1); // temp1 = fib(x−1)<br>local7 = fib(param1 − 2); // temp2 = fib(x−2)<br>local7 = local7 + local6; // ret =<br>temp1+temp2<br>}<br>return local7:<br>} |

TABLE 3 test/pentium/fromssa2 (as of 24/Sep/04):

| Original source code | Decompiled source code |
|---|---|
| void main( ) { | int main(int argc, char** argv, char** envp) |

TABLE 3-continued test/pentium/fromssa2 (as of 24/Sep/04):

| Original source code | Decompiled source code |
|---|---|
|  | { |
| int a, x; | int local8; // r27 // a |
| a = 0; | local8 = 0; |
| do { | do { |
|   a = a+1; |   local8++; |
|   x = a; |   %pc = %pc − 209; // x not assigned; error with %pc |
|   printf("%d ", a); |   printf("%d ", local8); |
| } while (a < 10); | } while (local8 <= 9); // Minor change |
| printf("a is %d, x is %d\n", a, x); | printf("a is %d, x is %d\n", 10, 10); // Note 10,10 |
| return 0; | return 0; |
| } | } |

Exemplary Tool "Front End"

Figure 10:
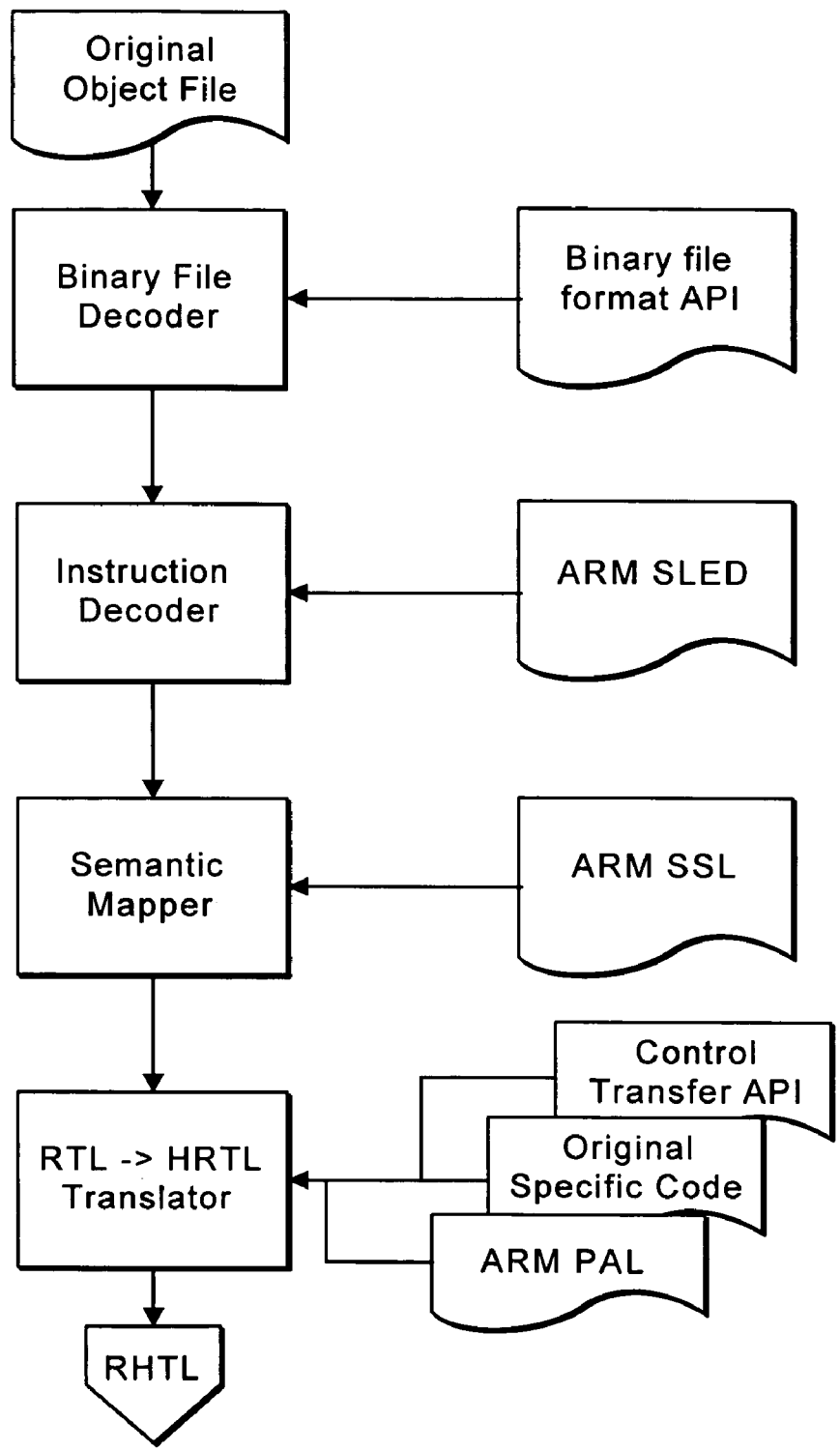
FIG. 10 shows an exemplary illustrative non-limiting more detailed data flow.
Figure 11:
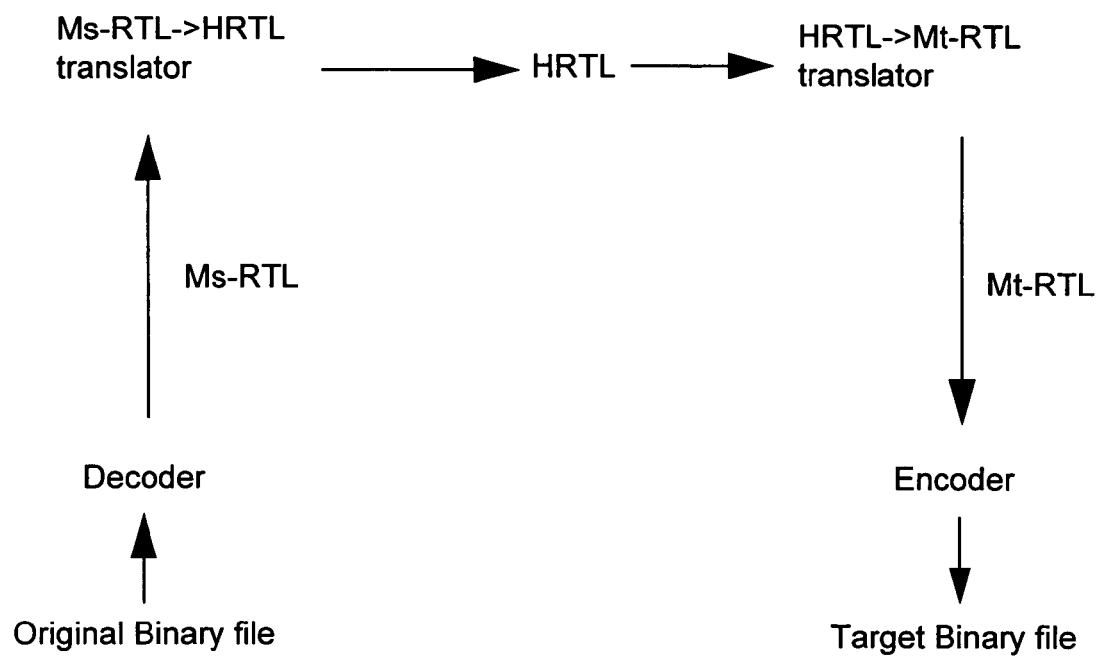
FIG. 11 shows an exemplary illustrative non-limiting high level view of exemplary translation.
Figure 12:
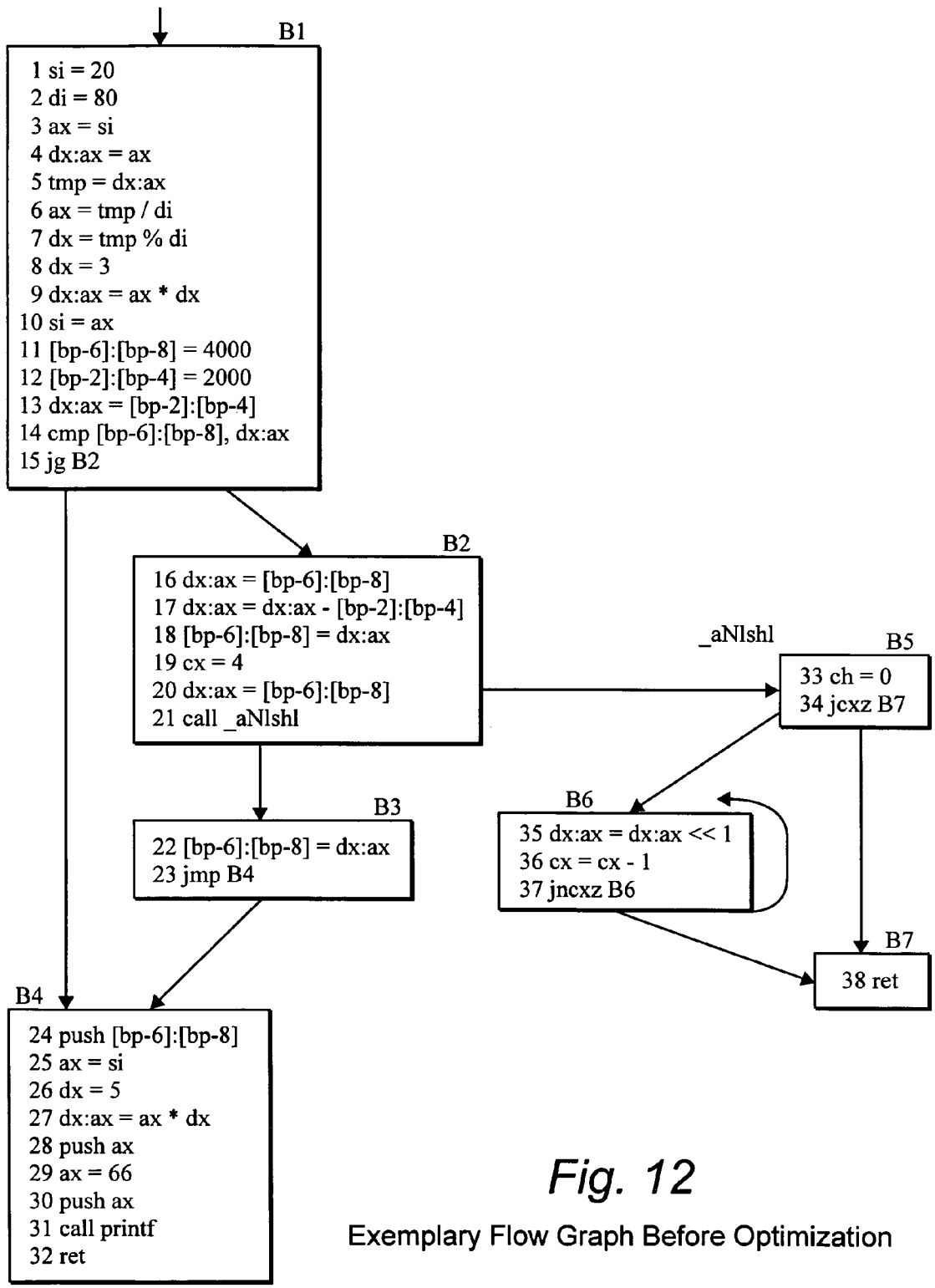
FIG. 12 shows an exemplary illustrative flow graph of an illustrative application before optimization.
Figure 13:
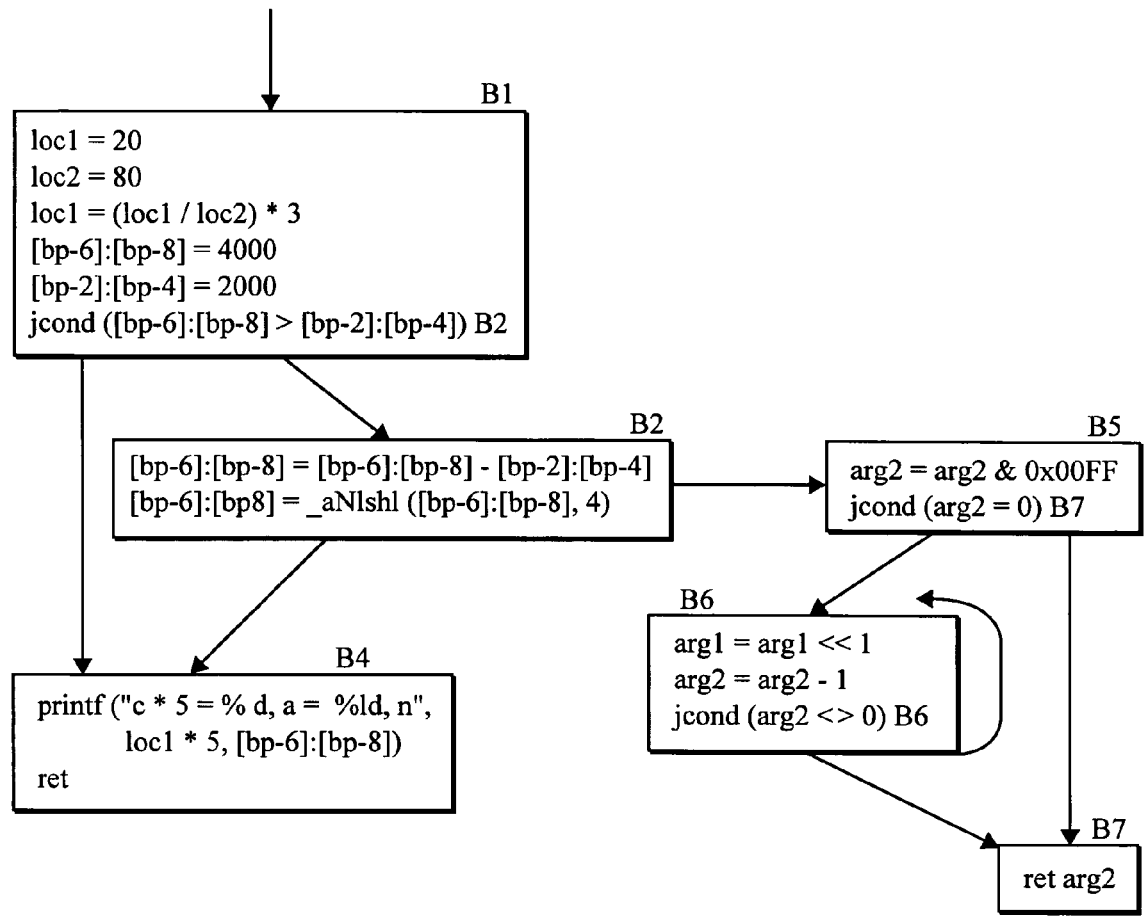
FIG. 13 shows an exemplary illustrative flow graph of the illustrative FIG. 12 application after code optimization.

The exemplary illustrative implementation uses a "front end" consisting of a series of modules that transform the source input into a high-level representation. The front end may comprise the following modules illustrated in FIG. 10:

binary file decoder instruction decoder semantic mapper original RTM to HRTL translator The exemplary illustrative implementation may not require a true lexical analyzer. Due to the highly regular nature of machine code, there may not be a need for a complex lexical analysis. Of course, one could be provided if desired. In the exemplary illustrative implementation, however, the lexical analyzer is replaced with a binary file decoder to read in the original source object code (see FIG. 10).

BINARY FILE DECODER  Each OS has its own executable file format. Example of different file formats as EXE for Microsoft DOS, SOM for PA/RISC, ELF for Linux. The Binary File Decoder decodes the original object file, finds the entry point to the program and abstracts other file specific details from the rest of the NASTSU system. A specific version of the decoder has been written to handle original AGB binary object files.

The binary file decoder decodes the source binary file into an internal representation that supports the binary file format API. All text and data sections are copied "as is" into memory and information about the binary file is stored in an internal representation.

The binary file decoder makes the entry point into the text section available, as well as the main entry point into the user-written part of the program (if available and detectable).

INSTRUCTION DECODER  The instruction decoder disassembles the (text/code) instruction stream starting at the main entry point. The disassembly matches the binary representation of instructions into equivalent assembly instructions, as specified in the machine's SLED file. This support is done using the New Jersey Machine Code toolkit's matching files [RF97]. The algorithm used is the standard reaching algorithm from a given entry point [SCK+93, CG95]:

Starting at an entry point, follow the program's path until a transfer of control is met. When a control transfer implies more than one target address, follow one of the addresses and place the others on a queue to be processed (i.e., these are new entry points). When a path ends, follow another path from the queue to be processed, until no addresses remain in the queue.

Note that since the translation is done statically, it is not always possible to know *a priori* the targets of computed transfers of control such as indirect or indexed jumps or indirect calls. Analysis of such cases is described latter, which allows for better coverage when decoding the text section; however, it cannot guarantee complete code coverage.

SEMANTIC MAPPER

The semantic mapper maps assembly instructions into RTLs for the source machine, effectively generating Ms-RTLs for the source binary file's code section. The RTLs are provided by the SSL specification for that machine. This step is done immediately after an assembly instruction is matched; that instruction is transformed into a list of register transfers and stored in this representation.

Ms-RTL to HRTL translator

The Ms-RTL to HRTL translator is the key module in the framework that allows us to achieve machine independence in representing the program's code. This module transforms RTL instructions into HRTL instructions by supporting an informal control transfer API, performing analyses on procedural information (such as parameters, locals and return locations), and adding any extra hand-written code to support peculiarities of the source instruction set. The latter peculiarities include delayed branches on the SPARC architecture or floating point stack-based instructions on x86.

Control transfer. Support for the control transfer API allows us to transform RTL instructions into very simple HRTL instructions that do not take the required parameters yet. For example, a sequence of RTL instructions can be transformed into a call HRTL instruction even though no analysis has been performed to determine the parameters to the call instruction *per se*. This intermediate state in the HRTL representation is referred to as I-RTL. In a similar way, jumps and return instructions are transformed into I-RTLs and then analyzed for operands.

Procedural abstraction. The procedural abstraction analysis makes use of PAL descriptions to determine the parameters passed to a procedure. This inter-procedural analysis is performed based on a liveness analysis on locations that are valid parameter-locations at the caller and callee sites. We also transform the code in each procedure so that references to the frame pointer are transformed into references to an abstract frame pointer ($afp), which is a conceptual pointer to the end of the stack frame (usually, where the stack pointer points after the callee prologue). The analysis keeps track of changes to registers relating to $afp, usually the stack pointer, and often also a frame pointer register. It knows the relationship between $afp and these registers at every instruction, and replaces references to these registers with $afp plus or minus a constant.

The advantage of using a conceptual frame pointer such as $afp is that we do not need to emulate a moving stack pointer on the target machine, which may not be efficient; for example, RISC machines do not have push instructions, and simulating them is very inefficient. Instead, we generate code that is much more in harmony with the target architecture. An array of bytes is generated to handle these source stack frame locations, with the array name becoming the equivalent location to $afp (or array name + size for machines where the stack grows upwards). A complete description of these analyses is available in [2].

Note that no changes are made to the data of the source program, that is, the data and all references to them remain unchanged.

Once a HRTL representation of the program has been obtained, binary translation-specific optimizations can be performed on the representation. For example, when translating to a machine with different endianness, the common technique is to perform byte swapping of data after each load and before each store instruction. An analysis at the HRTL level may help reduce the number of byte swaps required at each load and store from memory. This type of optimization, though feasible, was not implemented.

*Front End Parser Tools and Files*

The NATSU front end is constructed with several tools. These tools make use of custom descriptions of the original object.

NJMCT      The New Jersey Machine Code Toolkit (NJMCT)[3] is a a parser generator that produces a custom lexical analyzer.

The New Jersey Machine-Code Toolkit helps programmers write applications that process machine code/assemblers, disassemblers, code generators, tracers, profilers, debuggers, and more.

The generated parser includes a simple equation solver[4]. The solver finds solutions for sets of linear equations extended with several nonlinear operators, including integer division and modulus, sign extension, and bit slicing. The solver uses a technique called balancing, which can eliminate some nonlinear operators from a set of equations before applying Gaussian elimination. The solver's principal advantages are its simplicity and its ability to handle some nonlinear operators, including nonlinear functions of more than one variable.

The toolkit lets programmers encode and decode machine instructions symbolically. It transforms symbolic manipulations into bit manipulations, guided by a specification that does mappings between symbolic and binary representations of instructions. The NCMCT was created by Norman Ramsey at Bell Labs and Marry F. Fernandez at Princeton University. NCMCT, like most parser generators, require a context-free grammar definition of the code to be analyzed. While the most common format for context-free grammars is extended Bacus-Noir Format (eBNF) the context-free grammar used in the NJMCT is in a format know as SLED. The output from the NCMCT is C sources files for creating a parser.

The parser generated can be used to create assembly listings, or tuple Intermediate Language (IL) representations. In Nintendo's configuration the parser generates a tuple intermediate language data stream. The generated parser code is linked into NATSU.

SLED

SLED[5] stands for Specification Language for Encoding and Decoding. SLED describes the format and content of machine instructions for a particular CPU. SLED uses four elements; *fields* and *tokens* describe parts of instructions; *patterns* describe binary representations of instructions or groups of instructions; and *constructors* map between the abstract and binary levels. SLED is designed to follow standard CPU architecture specification documentation as possible. The following is an example of a SLED definition for some of the shift operators on the X86:

```
OP4 := { "rlc", "rrc", "rl", "rr" };
ROT := { "RCL", "RCR", "ROL", "ROR" };

ROLS := { "RCL","ROL" };
RORS := { "RCR","ROR" };
ROT[IDX].B.EV.1 modrm

*8* tmpb1 := modrm{8}

*8* tmpb2 := tmpb OP4[IDX] 1

*8* modrm := tmpb2;

ROLS[IDX].B.EV.1 modrm   ROLFLAGS8(tmpb2, tmpb1, 1);
RORS[IDX].B.EV.1 modrm   RORFLAGS8(tmpb2, tmpb1, 1);

ROT[IDX].B.EV.1OW modrm

*16* tmph1 := modrm{16}

*16* tmph2 := tmph1 OP4[IDX] 1

*16* modrm := tmph2;

ROLS[IDX].B.EV.1OW modrm   ROLFLAGS16(tmph2, tmph1, 1);
RORS[IDX].B.EV.1OW modrm   RORFLAGS16(tmph2, tmph1, 1);

ROT[IDX].B.EV.1OD modrm

*32* tmp1 := modrm{32}

*32* tmp2 := tmp1 OP4[IDX] 1

*32* modrm := tmp2;

ROLS[IDX].B.EV.1OD modrm   ROLFLAGS32(tmp2, tmp1, 1);
```

RORS[IDX].B.EV.IOD modrm  RORFLAGS32(tmp2, tmp1, 1);

ROT[IDX].B.EV.CL modrm

*8* tmpb1 := modrm{8}

*8* tmpb2 := tmpb1 OP4[IDX] %ecx

*8* modrm := tmpb2;

ROLS[IDX].B.EV.CL  modrm  ROLFLAGS8(tmpb2, tmpb1, %ecx);

RORS[IDX].B.EV.CL  modrm  RORFLAGS8(tmpb2, tmpb1, %ecx);

ROT[IDX].B.EV.CLOW modrm

*16* tmph1 := modrm{16}

*16* tmph2 := tmph1 OP4[IDX] %ecx

*16* modrm := tmph2;

ROLS[IDX].B.EV.CLOW  modrm  ROLFLAGS16(tmph2, tmph1, %ecx);

RORS[IDX].B.EV.CLOW  modrm  RORFLAGS16(tmph2, tmph1, %ecx);

ROT[IDX].B.EV.CLOD modrm

*32* tmp1 := modrm{32}

*32* tmp2 := tmp1 OP4[IDX] %ecx

*32* modrm := tmp2;

ROLS[IDX].B.EV.CLOD  modrm  ROLFLAGS32(tmp2, tmp1, %ecx);

RORS[IDX].B.EV.CLOD  modrm  RORFLAGS32(tmp2, tmp1, %ecx);

ROT[IDX].B.EB.IB modrm, i8

*8* tmpb1 := modrm{8}

*8* tmpb2 := tmpb1 OP4[IDX] i8

*8* modrm := tmpb2;

ROLS[IDX].B.EB.IB  modrm, i8  ROLFLAGS8(tmpb2, tmpb1, i8);

RORS[IDX].B.EB.IB  modrm, i8  RORFLAGS8(tmpb2, tmpb1, i8);

ROT[IDX].B.EV.IBOW modrm, i8

*16* tmph1 := modrm{16}

*16* tmph2 := tmph1 OP4[IDX] sgnex(8, 16, i8)

```
*16* modrm := tmph2;
ROLS[IDX].B.EV.IBOW  modrm, i8
    ROLFLAGS16(tmph2, tmph1, i8);
RORS[IDX].B.EV.IBOW  modrm, i8
    RORFLAGS16(tmph2, tmph1, i8);

ROT[IDX].B.EV.IBOD modrm, i8
    *32* tmp1 := modrm{8}
    *32* tmp2 := tmp1 OP4[IDX] i8
    *32* modrm := tmp2;
ROLS[IDX].B.EV.IBOD  modrm, i8 ROLFLAGS32(tmp2, tmp1, i8);
RORS[IDX].B.EV.IBOD  modrm, i8 RORFLAGS32(tmp2, tmp1, i8):
```

| | |
|---|---|
| OCHA FILE | NOA Engineering has developed a SLED description for the ARM7 TDMI (both 32 bit ARM and 16 bit thumb modes) known as the OCHA (Original Computer Hardware Architecture) File. The OCHA File is used by the NJMCT to generate a parser C source file unique to the original object CPU machine code format. Each original object CPU machine code format would require its own SLED file. The OCHA file text is included as an appendix to this document. |
| SSL | The SSL or Semantic Specification Language represents the Syntax of the original object. A copy of the SSL description is included in the appendix |

NATSU Intermediate Representations

As with compilers, binary translators make use of several intermediate representations of the code to be translated. A program is a collection of procedures. A procedure is represented by its control flow graph and instructions. Instructions are represented by one of two intermediate representations. A control flow graph is a series of basic blocks that describe transfers of control in a procedure. Individual basic blocks contain information about the instructions in that block.

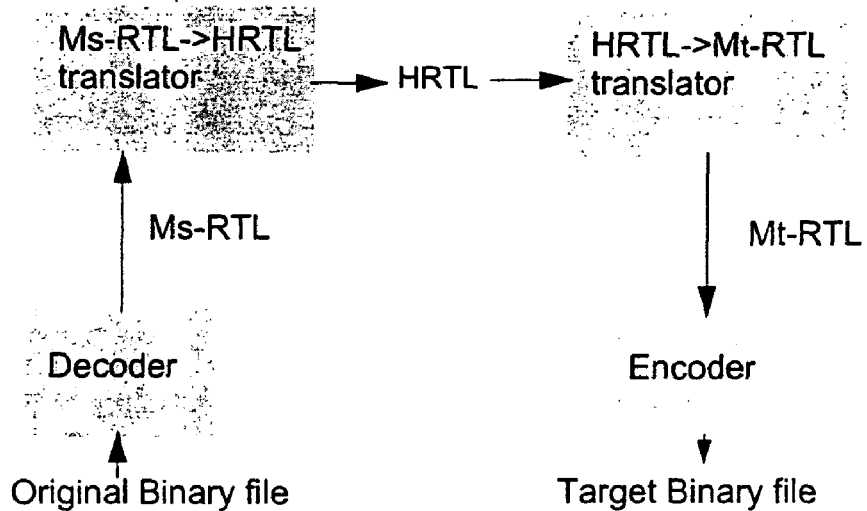

FIGURE 6. High level view of translation

Two main intermediate representations for the code of the program are used in the framework: a low-level representation based on register transfers called RTL, and a high-level, machine independent representation called HRTL. A high-level view of a binary translator based on these two representations is shown in Figure 6 on page 17. The decoding stage translates the code in the source binary file into RTLs for that source machine Ms. An analysis stage then translates those Ms-RTLs into HRTLs, by abstracting away information from the underlying machine. Once we have HRTL code, standard compiler back end techniques are used to generate binary code for the target machine Mt. An analysis stage translates the HRTL code into RTLs for the target machine, ensuring the Mt-RTLs represent instructions of the target machine. Finally, the encoding stage translates the machine-specific Mt-RTLs into binary code for the target machine.

Modern computers are at the lowest machine level based on the concept of register transfer of information. The register may be either a named register such as the accumulator or a sequentially numbered register call memory. Computer operations take data from zero or more registers, performs operation and deliver the results into zero or more registers. While additional operation are possible, such as hardware stacks, most code activity can be understood by analyzing the is register transfer activity.

RTL

A register transfer list (RTL) is a collection of sequential effects. Each effect has the form 'location := expression', and the expression is always evaluated without side effects, so that all state change is explicit. RTL expressions are represented as trees, the leaves of which refer to constants or to the values contained in locations. Note that although the tree leaves refer to locations, the values themselves are not necessarily calculated, only the location is indicated. The internal nodes of the trees are 'RTL operators'. The locations available are an infinite number of registers $r[.] and infinite memory $m[.]. Register locations can be named, for example, $OF can represent the 1-bit overflow flag. In this paper, we use the symbol $ to denote locations.

To illustrate this, the following is an ASCII representation of an RTL representing the effect of the SPARC architecture and cc instruction. This instruction has an i field which determines whether the instruction takes a register or an signed immediate value as its second operand:

```
$r[rd] <-- and (*$r[rs1], if i = 0 then *$r[rs2] else simm13! fi);
$NF <-- bit (and (*$r[rs1], if i = 0 then *$r[rs2] else simm13! fi) < 0);
$ZF <-- bit (and (*$r[rs1], if i = 0 then *$r[rs2] else simm13! fi) = 0);
$OF <-- 0;
$CF <-- 0
```

This RTL does a bitwise AND of the contents of register r[rs1], either with the contents of register r[rs2] or with a signed immediate value (simm13). The symbol * denotes a value and the symbol ! stands for sign extension. This result is stored in register r[rd], and it is also used to set two of the four condition codes. The other two condition codes are set to zero by the instruction.

RTLs are complex and detailed. Machine descriptions make use of the 'super-operator' technique [Pro95] to simplify the description of condition code effects. For example, we define a super-operator LOGICAL for the SPARC architecture such that LOGICAL(X) stands for $NF \leftarrow$ bit $((X) < 0)$;

$ZF \leftarrow$ bit $((X) = 0)$;

$OF \leftarrow 0$;

$CF \leftarrow 0$

Register locations carry with them typing information in the form of a (type, size, sign) tuple. The type is one of four low-level, machine-like, types; namely, integer, float, pointer to data or pointer to code. The size is the number of bits of the type, typically from 1 to 64. The sign is a boolean denoting whether the location is signed or not (integer types only).

An 'RTL language' is defined by a collection of locations and operators. For binary translation, a suitable RTL language is defined by taking the union of locations on machines Ms and Mt and the union of the operators used in the descriptions of machine Ms and Mt. The 'machine X invariant' defines a sub-language of RTLs called the X-RTLs; an RTL is an X-RTL if and only if it can be represented as a single instruction on machine X; i.e., there is a 1:1 correspondence between assembly instructions for machine X and X-RTL instructions.

HRTL

The high-level register transfer language, HRTL, is a collection of instructions that affect the state of locations. The language is defined by a set of operators and instructions. The main aim in the design of the HRTL language was to be able to express code semantics in a way that was machine independent. As such, translations to the HRTL language require analyses that abstract away the peculiarities of individual machine instruction sets. For example, features such as the next PC register in architectures that support delayed branching semantics, are not exposed in the HRTL representation; such code needs to be transformed into equivalent code that does not make use of the next PC register.

HRTL instructions operate on locations. As per RTL, there are an infinite number of registers ($r[.], which may be named, e.g., $X) and an infinite memory ($m[.]). Further, HRTL has an infinite number of variables ($v.), which are locations that can hold actual and formal parameters of procedure calls. Both register and variable locations carry typing information.

HRTL supports assignments of the RTL form 'location := expression', as well as higher-level instructions such as conditional, unconditional and computed jumps of the form 'jump [cond expression] <list of locations>', procedure call of the form 'call location (<list of variables>)', and returns of the form 'return location'. Assignments also support the form 'location := call location (<list of variables>)'.

As an illustration, the following is an ASCII representation of a HRTL that represents the SPARC architecture and cc %o3,64,%g1 instruction after transforming the sample SPARC-RTL of x2.1.1. In the example, %o3 is represented by register $r[10] and %g1 by register $r[1]. Note that condition code analysis will either determine that assignments to condition codes are dead (and hence remove them) or move the effect of the condition code assignment to another HRTL that makes use of a conditional expression. In this example, the condition codes were found to be dead.

```
$r[1] <-- and (*$r[10], 64);
```

A more interesting example is the HRTL representation of the SPARC architecture call instruction, which stores the return program counter address in register %o7 (i.e., register $r[15]). The SPARC-RTL for this instruction is

```
$r[15] <-- *$pc;
$pc <-- *$npc;
$npc <-- *$r[15] + (4 * disp30);
```

The SPARC architecture call instruction with displacement 0x4318, invoked at program counter location 0x00010B20 is transformed into the following HRTL instruction

```
call 0x00021780;
``` where 0x00021780 is equivalent to the computation of 0x00010B20 + (4 * 0x4318).

EXAMPLE RTL

In order to give readers an idea of the implications of the HRTL representation, we show, without going into low-level details about the translation process, how a series of SPARC-RTLs and Pentium-RTLs end up being represented in HRTL. The sample C language statement is from the Fibonacci program, where the following statement invokes the fibonacci procedure fib with the argument number and stores its result in variable value value = fib (number);

The un-optimized SPARC-assembly code for the C language statement is ld [%fp-20], %o0 // load parameter call 0x10a9c // call fib nop st %o0, [%fp-24] // store return value which corresponds to the following SPARC-RTLs. Note that only control transfer instructions make explicit changes to the $pc and $npc registers.

$r[8] <-- *$m[*$r[30]-20]; // load parameter $r[15] <-- 0x010b40; // call fib $pc <-- *$npc;

$npc <-- 0x010a9c;

$m[*$r[30]-24] <-- *$r[8]; // store return value

The same C language statement is represented by the following Pentium-assembly instructions

| movl | 0xfffffffc(%ebp), %eax | // load parameter |
| pushl | %eax | // put it on the stack |
| call | 0x8048960 | // call fib |
| addl | $0x4, %esp | // fix up the stack |
| movl | %eax, 0xfffffff8(%ebp) | // store return value | which corresponds to the following Pentium-RTLs

| | |
|---|---|
| $r[24] <-- *$m[*$r[29]-4] | // load parameter |
| $r[28] <-- *$r[28] - 4 // | put it on the stack |
| $m[*$r[28]] <-- *$r[24] | |
| $r[28] <-- *$r[28] - 4 | // call fib |
| $m[*$r[28]] <-- *$pc + 5 | |
| $pc <-- 0x8048960 | |
| $r[28] <-- *$r[28] + 4 | // fix stack frame |
| $r[24] <-- *$r[24] | |
| $m[*$r[29]-8] <-- *$r[24] | // assign return value |

After transformational analysis, the HRTL code obtained for both RTL representations follows Table 4:

| HRTL (SPARC) | HRTL (Pentium) |
|---|---|
| $v0 <-- *$m[*$afp+100] | $v3 <-- *$m[*$afp+4] |
| $v0 <-- call fib (*$v0) | $v4 <-- *$v3 |
| $m[*$afp+96] <-- *$v0 | $v3 <-- call fib (*$v4) |
| | $m[*$afp] <-- *$v3 |

The $afp named location is the abstract frame pointer, which points into the local memory stack for the procedure. It is clear that in both cases the code fetches a value from the local stack into a variable, then it passes the variable's value to the procedure call fib, which returns a result that it then places in another variable. That result value is then stored onto the local memory stack. Simple forward substitution would make both codes have the same number of HRTL instructions; that step is a simple optimization step left to the back end.

This example illustrates the benefits found from having a high-level, machine-independent representation. It is suitable for generating native code for a target machine in an optimal way, instead of emulating features of the source machine. In this case, we did not have to directly emulate the SPARC architecture $pc or $npc registers, which would have required us to update the equivalent of their values after every Pentium instruction in, most likely, two of the scarce Pentium registers.

Because compilers and linkers use several different strategies to build the executable object NATSU must use several different strategies to analyze the resulting object code.

LIBRARY SIGNATURES

We have developed a method for the detection of binary signatures. Binary hash signatures are used to identify libraries. If a library function is detected it can be tagged and an intelligent reference can be placed in the symbol table to the function. This technique has sevel advantages to the brut force translation of the original object: it allow the use of original C source library files, if available, and it allows for more readable target C files (e.g. "strcmp" wather than "proc003").

CONSTRAINT BASED ANALYSIS

NATSU will not make use of constraint based analysis.

DATA FLOW ANALYSIS

NATSU will make use of data flow analysis. Conventional data flow analysis collects information about the way variables are used in a program, and summarizes it in the form of sets. In decompilation, this information is used to transform and improve the quality of the intermediate code, preserving the meaning of the program as with standard compiler data flow analysis.

The aim of these optimizations is to eliminate all references to condition codes and registers as they do not exist in high-level languages, and to regenerate the high-level expressions available in the decompiled program; therefore transforming the LLIL code into HLIL code. This section makes references to the control flow graph in Figure 7 on page 24; a sample program which illustrates all optimizations that are described in this paper.

Figure 7:
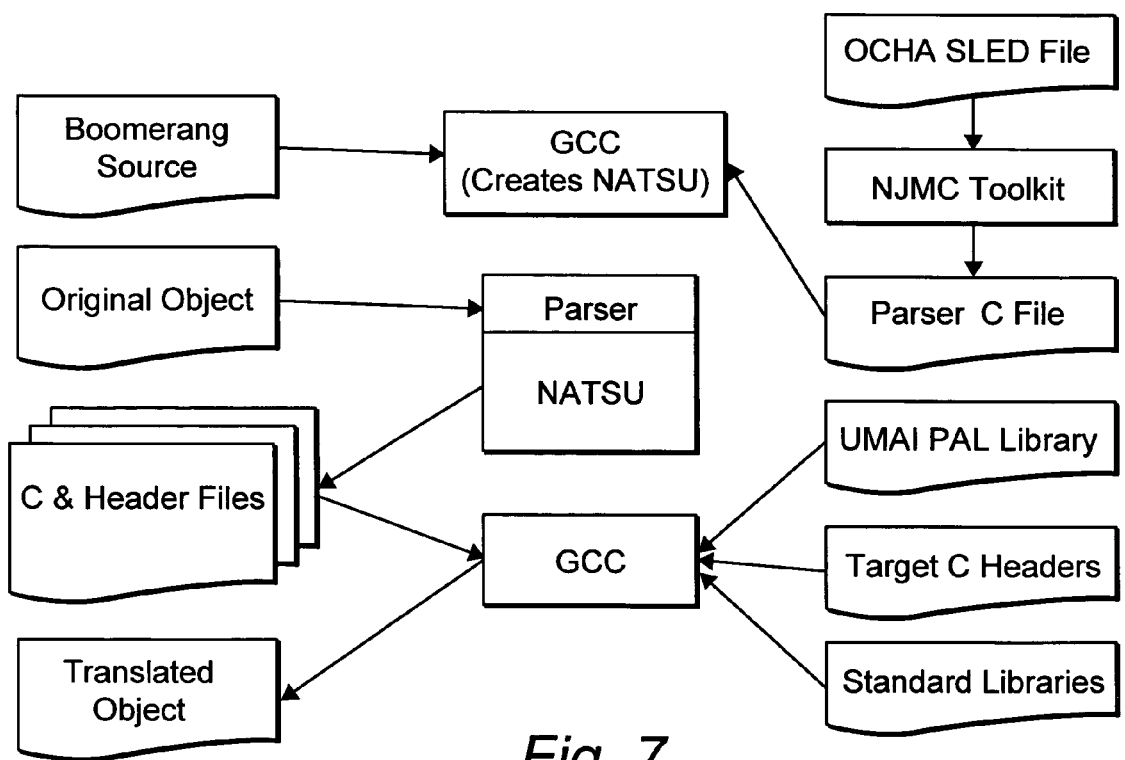
FIG. 7 shows an exemplary illustrative non-limiting tool chain component implementation.

In order to perform the data flow analysis, inter-procedure information is mostly summarized for each instruction in the form of definition-use (du) chains; the set of live uses associated with each definition of an identifier, and use-definition (ud) chains; the set of reaching definitions associated with each use of an identifier, for all flags and register identifiers. Variables flagged by the front-end as being register variables do not have a du-chain as they represent local variables rather than temporary registers. In Figure 7 on page 24, both si and di are flagged as register variables by the idiom analyzer of the front-end.andard compiler data flow analysis.

For all data flow analysis, registers that can be used as both word and byte registers (e.g. ax, ah, al) are treated as different registers in the analysis. For example, whenever register ax is defined, it also defines registers ah and al, but, if register al is defined, it defines only registers al and ax, but not register ah. This is needed so that uses of part of a register can be detected and treated as a byte identifier rather than an integer identifier.

FIGURE 7. Flow Graph Before Optimization

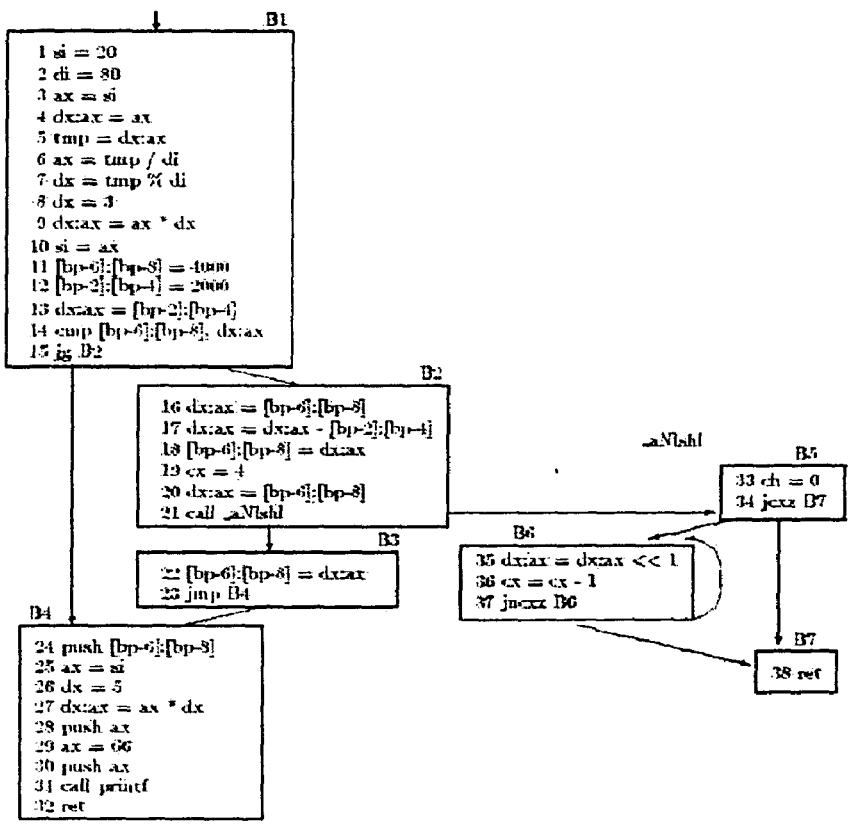

While computing du and ud chains, dead register elimination is done in the intermediate code. This analysis is needed even in binary code produced by an optimizing compiler given the nature of the LLIL, which performs one function per instruction, hence compound machine instructions are represented by several LLIL instructions. It is said that a register is dead if it is defined by an instruction and is not used before being redefined by a subsequent instruction. If the instruction that defines a dead register defines only this one register, it is said that the instruction is useless, and thus can be eliminated. On the other hand, if the instruction also defines other register(s), the instruction is still useful but should not define the dead register any more. In this case, the intermediate representation of the instruction is modified to reflect this fact. In the following code from basic block B1, from Figure 7, "Flow Graph Before Optimization," on page 24, register dx is dead at instructions 7 and 9 from inspection of the du chains:

```
6 ax = tmp / di ; du(ax)={9}
7 dx = tmp % di ; du(dx)={}
8 dx = 3 ; du(dx)={9}
9 dx:ax = ax * dx ; du(ax)={10} du(dx)={}
10 si = ax
```

Since instruction 7 defines only this register, it is redundant and can be eliminated. On the other hand, instruction 9 defines not only dx but ax as well, hence the instruction is not dead but is modified to reflect the fact that dx is no longer defined by this instruction, simplifying the code to the following:

```
6 ax = tmp / di ; du(ax)={9}
8 dx = 3 ; du(dx)={9}
9 ax = ax * dx ; du(ax)={10}
10 si = ax
```

If an instruction i is to be eliminated due to a dead register definition r defined in terms of other registers (i.e. r = f(r1; : : :; rn); n 1), the uses of these registers at instruction i no longer exist, and thus, the corresponding du-chains of the instructions that define the registers used at i are to be modified so that they no longer have a reference to i. This is done by checking the ud chain of i while performing dead register elimination.

ELIMINATION OF CONDITION CODES

It is said that a condition code is dead if it is defined by an instruction and is not used before redefinition. Since the definition of a condition code is a side effect of an instruction, eliminating dead flags does not make an instruction redundant; therefore this analysis leads to removal of data flow information on the instructions. In the following code from basic block B1, Figure 7 on page 24, the CF (carry) and ZF (zero) flags are dead at instruction 14 by inspection of their du chains:

```
14 cmp [bp-6]:[bp-8], dx:ax ; def={ZF,CF,SF}
; du(SF)={15}
; du(CF,ZF)={}
15 jg B2 ; use={SF}
```

The simplified code after removal of this information is the following:

```
14 cmp [bp-6]:[bp-8], dx:ax ; def= {SF}
; du(SF)={15}
15 jg B2 ; use = {SF}
```

The remaining condition codes are used by subsequent instructions, and are eliminated from the intermediate representation after propagating the essence of the boolean condition: for a particular flag(s) use, we find the instruction that defined the flag(s) and merge them according to the implicit boolean condition of the instruction that uses the flag. In the following code from basic block B1, Figure 7 on page 24, instruction 14 defines the SF flag which is used at instruction 15:

```
14 cmp [bp-6]:[bp-8], dx:ax ; def = {SF}
; du(SF) = {15}
15 jg B2 ; use = {SF}
; ud(SF) = {14}
```

Instruction 15 implicitly checks for a greater-than boolean condition, and instruction 14 compares the first identifier ([bp-6]:[bp-8]) against the second identifier (dx:ax). If the first identifier is greater than the second identifier, the SF is set. It is obvious from these instructions that the condition propagated is greater than, therefore leading to the following HLIL code:

15 jcond ([bp-6]:[bp-8] > dx:ax) B2 eliminating instruction 14 and thus eliminating all flag references.

This propagation method works well on extended basic blocks, where the identifiers of the boolean condition are propagated to two or more conditions within the one extended basic block. The algorithm can be extended to propagate condition codes that are defined in two or more basic blocks (i.e. by doing an and of the individual boolean conditions), but it has not been required in practice, since it is almost unknown for even optimizing compilers to attempt to track flag definitions across basic block boundaries[15].

ELIMINATION OF REGISTERS AND REGENERATION OF ARITHMETIC EXPRESSIONS

The regeneration of arithmetic expressions is based on the elimination of registers and the propagation of expressions via registers. Preliminary information on register arguments and function return registers is collected first since the machine language does not provide us with this type of information.

The register calling convention is used by compilers to speed up the invocation of a subroutine. It is an option available in most contemporary compilers, and is also used by the compiler runtime support routines. Given a subroutine, register arguments translate to registers that are used by the subroutine before being defined in the subroutine; i.e. upwards exposed uses of registers in the subroutine. In the following code from basic blocks B5 and B6, Figure 7, "Flow Graph Before Optimization," on page 24, subroutine _aNlshl, instruction 34 uses register cx which was partly defined at instruction 33, and instruction 35 uses registers dx and ax, neither of which were defined in that subroutine:

```
33 ch = 0
34 jcond (cx = 0) B7 ; ud(ch)={33}
   ; ud(cl)={}
35 dx:ax = dx:ax << 1 ; ud(dx:ax)={}
```

Information on registers used before definition in a subroutine is summarized by an inter-procdrure live register analysis: a register is live on entrance to the basic block that uses it. Standard live register equations are used to solve this problem. In this example, subroutine _aNlshl has the following LiveIn and LiveOut sets:

TABLE 5.

| Basic Block | LiveIn | LiveOut |
|---|---|---|
| B5 | {dx,ax,cl} | {dx,ax} |
| B6 | {dx,ax} | {} |
| B7 | {} | {} |

The set of LiveIn registers summarized for the header basic block B5 is the set of register arguments used by the subroutine; dx, ax, and cl. The formal argument list of this subroutine is updated to reflect these two arguments:

formal_arguments(_aNlshl) = (arg1 = dx:ax, arg2 = cl)

It is said that the _aNlshl subroutine uses these registers. In general, any subroutine that makes use of register arguments uses those registers, thus a CALL to one of these subroutines is also said to use those registers, as in the following instruction:

21 call _aNlshl ; use={dx,ax,cl}

Functions return results in registers, and there is no machine instruction that speci_es which registers are being returned by the function in CISC machines. After function return, the caller uses the registers returned by the function before they are redefined (i.e. these registers are live on entrance to the basic block that follows the function call). This register information is propagated across subroutine boundaries, and is solved with a reaching and live register analysis. In the following code from basic blocks B2 and B3, Figure 7, "Flow Graph Before Optimization," on page 24, instruction 22 uses registers dx and ax, which could have been redefined in the subroutine called at instruction 21 or at instruction 20:

20 dx:ax = [bp-6]:[bp-8] ; def={dx,ax}

; use = {}

21 call _aNlshl ; def={}

; use={dx,ax,cl}

22 [bp-6]:[bp-8] = dx:ax ; def={}

; use={dx,ax}

Summary information in the form of intraprocedural reaching definitions on subroutine _aNlshl leads to the following ReachIn and ReachOut sets:

Table 6:

| Basic Block | ReachIn | ReachOut |
|---|---|---|
| B5 | {} | {ch} |

Table 6:

| B6 | {ch} | {cx,dx,ax} |
| B7 | {cx,dx,ax} | {cx,dx,ax} |

This analysis states that the last definitions of registers cx, dx, and ax reach the end of the subroutine (i.e.ReachOut set of basic block B7). The caller subroutine uses only some of these reaching registers, thus it is necessary to determine which registers are upwards exposed in the successor basic block to the subroutine invocation; this information is summarized in the form of an interprocedural live register analysis, to cater for registers propagated across subroutine boundaries. Traditional live register equations are used for the call graph of the complete program, or the set of more precise live equations recently described by Srivastava and Wall. For the example of Figure 7 on page 24, either set of equations produces the following results:

Table 7:

| Basic Block | LiveIn | LiveOut |
| --- | --- | --- |
| B1 | {} | {} |
| B2 | {} | {dx,ax} |
| B3 | {dx,ax} | {} |
| B4 | {} | {} |
| B5 | {dx,ax,cl} | {dx,ax} |
| B6 | {dx,ax} | {dx,ax} |
| B7 | {dx,ax} | {dx,ax} |

From the three registers that reach instruction 22 in basic block B3, only two of these registers are used (i.e. belong to LiveIn of B3): dx and ax, thus these registers are the only registers of interest once the called subroutine has been _nished, and are the registers returned by the function.

This condition is formally expressed by the intersection of the ReachOut set of the function and the LiveIn set of the basic block following the CALL, to eliminate propagated registers across subroutines:

$$\text{ReachOut}(B7) \cap \text{LiveIn}(B3) = \{dx, ax\} \qquad \text{(EQ 1)}$$

Once a subroutine has been determined to be a function and the register(s) that the function returns has been determined, this information is propagated to two different places: the return instruction(s) from the function and the instructions that CALL this function. In the former case, all return basic blocks have a ret instruction; this instruction is modi_ed to return the registers that the function returns. In this example, instruction 38 of basic block B7, Figure 7, "Flow Graph Before Optimization," on page 24is modified to the following code:

```
38 ret dx:ax
```

In the latter case, any function invocation instruction (i.e. CALL instruction) is replaced by an assign instruction that takes as left-hand side the defined register(s), and takes the function call as the right-hand side of the instruction, as in the following code:

```
21 dx:ax = call _aNlshl ; def={dx,ax}
   ; use={dx,ax,cl}
```

The instruction is transformed into an assign instruction, and defines the registers on the left-hand side.

It is important to note that in the case of library functions whose return register(s) is not used, the call is not transformed into an assign instruction but remains as a CALL instruction (e.g. printf).

EXTENDED REGISTER COPY PROPAGATION

Register copy propagation is the method by which a defined register in an assignment instruction, say ax = cx, is replaced in a subsequent instruction(s) that references or uses this register, if neither register is modi_ed after the assignment (i.e. neither ax nor cx is redefined). If this is the case, references to register ax are replaced by references to register cx, and, if all uses of ax are replaced by cx then ax becomes dead and the assignment instruction is eliminated. A use of ax can be replaced with a use of cx if the instruction ax = cx is the only definition of ax that reaches the use of ax and if no assignments to cx have occurred after the instruction ax = cx. The former condition is checked with ud chains, the latter condition is checked with an x-clear condition as described later. For example, in the following code from basic block B1, Figure 7 on page 24, after dead-register elimination:

```
3 ax = si ; du(ax)={4}
4 dx:ax = ax ; du(dx:ax)={5}
```

```
  ; ud(ax)={3}
5 tmp = dx:ax ; du(tmp)={6}
  ; ud(dx:ax)={4}
6 ax = tmp / di ; du(ax)={9}
  ; ud(tmp)={5}
8 dx = 3 ; du(dx)={8}
9 ax = ax * dx ; du(ax)={10}
  ; ud(ax)={6} ud(dx)={8}
10 si = ax ; ud(ax)={9}
``` the use of register ax in instruction 4 is replaced with a use of the register variable si, making the definition of ax in 3 dead. The use of dx:ax in instruction 5 is replaced with a use of si (from instruction 4), making the definition of dx:ax dead. The use of tmp in instruction 6 is replaced with a use of si (from instruction 5), making the definition of tmp dead at 5. The use of ax at instruction 9 is replaced with a use of (si / di) from instruction 6, making the definition of ax dead. In the same instruction, the use of dx is replaced with a use of constant 3 from instruction 8, making the definition of dx at 8 dead. Finally, the use of ax at instruction 10 is replaced with a use of (si / di) * 3 from instruction 9, making the definition of ax at 9 dead. Since the register defined in instructions 3 ! 9 were used only once, and all these registers became dead, the instructions are eliminated, leading to the _final code:

```
10 si = (si / di) * 3
```

Register copy propagation is not limited to assign instructions only. As seen in Figure 8 on page 34, two other HLIL instructions also define registers: CALL defines a register if the invoked subroutine is a function, and POP defines the register associated with that instruction. Also, several instructions use registers: CALL uses any register arguments passed to it, jcond uses any registers associated with its boolean conditional expression, ret uses any registers it returns from a function, and PUSH uses all registers it pushes onto the stack. Since PUSH and POP rely on an extra data structure, the stack, a stack of expressions is used to cater for values pushed and popped from the stack. Note that the saving and restoring of registers by a subroutine at pre and post-amble have been removed from the intermediate representation by the front-end (these registers are flagged as being register variables within that subroutine), hence they are not considered true uses or definitions of registers. The front-end has also removed all POP instructions that restore the stack after a subroutine call or during subroutine return, hence these definitions of registers are not part of the HLIL code. Therefore, both PUSH and POP are used in conjunction with the spilling of a register, and are eliminated from the HLIL code in the following way: a PUSH copies the arithmetic expression associated with the register to the stack, and a POP translates to an assign of the top of stack expression to the associated register with the POP. In this way, pseudo-HLIL instructions are removed from the final representation.

Most actual parameters to a subroutine are pushed on the stack before invocation to the subroutine. Since nested subroutine calls are allowed in most languages, the arguments pushed on the stack represent those arguments of one or more subroutines, thus it is necessary to determine which arguments belong to which subroutine. Whenever a CALL instruction is met, the necessary number of arguments are popped from the stack, based on the _xed size of argument bytes restored by the subroutine (and summarized by the front-end). In the following code from basic block B4, Figure 7, "Flow Graph Before Optimization," on page 24, instructions 24, 28 and 30 PUSH the arguments for the printf call at instruction 31:

TABLE 8. High-Level Instructions that Define and Use Registers

| Define | Use |
|---|---|
| assign (lhs) | assign (rhs) |
| CALL (function) | CALL (register arguments) |
| POP | jcond |
| ret | (function return registers) |
|  | PUSH |

```
24 push [bp-6]:[bp-8]
28 push (si * 5)
30 push 66
31 call printf
```

When the call to printf is reached, information on this function is checked to determine how many bytes of arguments the function call takes; in this case it takes 8 bytes. Expressions are popped from the stack, adding up the size of their type, and are placed on the actual parameter list associated with the subroutine call using the calling convention determined by the front-end. In this example, 3 expressions are popped from the stack with type sizes of 2, 2, and 4, and are stored using the C calling convention, leading to the following code:

```
31 call printf (66, si * 5, [bp-6]:[bp-8])
```

In the case of register arguments, since these arguments are not pushed on the stack but remain in registers, when performing register copy propagation and reaching a CALL instruction that uses one or more registers, the expression associated with this register(s) is placed on the actual parameter list of the invoked subroutine. For example, in the following code from basic blocks B2 and B3, Figure 7 on page 24, the CALL at instruction 21 uses registers dx, ax, and cl:

```
19 cl = 4 ; du(cl)={21}
20 dx:ax = [bp-6]:[bp-8] ; du(dx:ax)={21}
21 dx:ax = call _aNlshl ; ud(dx:ax)={20}
                       ; ud(cl)={19}
```

The expressions associated with these registers are moved to the actual parameter list of _aNlshl in the order defined by the formal argument list, leading to the following code:

```
21 dx:ax = call _aNlshl ([bp-6]:[bp-8], 4)
```

Instructions 19 and 20 are eliminated since they now define dead registers.

During the instantiation of actual arguments to formal arguments, data types for these arguments need to be verified, as if they are di_erent, one of the data types needs to be modified. Consider the following partial code from basic block B4, Figure 7 on page 24:

```
31 call printf (66, si * 5, [bp-6]:[bp-8])
``` where the actual parameter list has the following data types: integer constant, integer, and long integer. The formal argument list of printf has a pointer to a character string as the first argument, and a variable number of unknown data type arguments following it1. We can only verify the type of the first argument in this case, leading to a mismatch. Given that the data types used by the library subroutines must be right (i.e. they are trusted), it is safe to say that the actual integer constant must be an offset into memory, pointing to a character string. By checking virtual memory, it is found that at location DS:0066 there is a string; thus, the integer constant is replaced by the string itself. For the next two arguments, since they have an unknown formal type, the type given by the caller is trusted, leading to the following code:

```
31 call printf("c * 5 = %d, a = %ld\n",
    si * 5, [bp-6]:[bp-8])
```

Another case of type propagation is the conversion of two integers into one long variable, where the callee has determined that one of the arguments is a long variable, but the caller has so far used the actual argument as two separate integers.

The transformations presented here modify the initial graph in Figure 7 on page 24, into the equivalent graph of Figure 8 on page 34. In this graph, all identifiers are in terms of their local offset from the stack or a register variable. These identifiers are renamed during code generation and are assigned arbitrary names according to their location: local or argument.

FIGURE 8. Control Flow Graph After Code Optimization

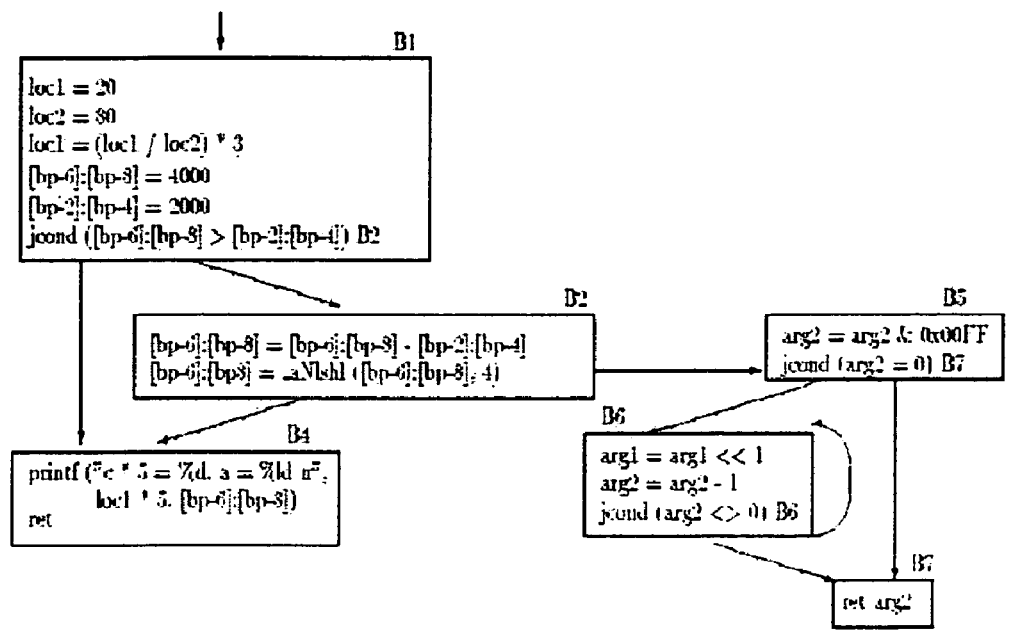

Having given all different types of examples where register copy and type propagation is possible, we now present the set of necessary conditions for performing such propagation of registers and associated expressions. From the definition, the instruction that uses the register to be propagated must be able to uniquely identify the instruction that defined that register, hence the uniqueness condition:

- For a given register use, the corresponding register definition must be unique, as registers that are used before being redefined translate to temporary registers that hold an intermediate result for the machine.

Redefinition of the involved registers cannot happen between the instructions. Even more important, the identifiers associated with the expression in the rhs of the defined register cannot be redefined along that path, hence the rhs-clear path condition:

- The identifiers x in an expression that defines a register r (i.e. the rhs of the instruction) that satisfies the uniqueness condition are checked to have an x-clear path to the instruction that uses the register r. The rhs-clear condition for an instruction j that uses a register r which is uniquely defined at instruction i is formally defined as:

$$\text{rhs-clear}_{i-j} = \bigcap_{x \in rhs(i)} x - clear_{i-j}$$

where rhs(i) is the rhs of instruction i and x is an identifier that belongs to the rhs(i)

and x-cleari!j = True if x is not redefined along the path i ! j

False otherwise listing figure next is the algorithm used for extended register copy propagation. In this algorithm, the propagate(r,exp1,exp2) function propagates the use of register r in exp2 with exp1, and new RegArg(r,l) places register r in the actual argument list l.

procedure ExtRegCopyProp (p: subroutineRecord)

initExpStk().

```
for (all basic blocks b of subroutine p in postorder) do
    for (all instructions j in b) do
    for (all registers r used by instruction j) do
        if (ud(r) = {i}) then /* uniquely defined at instruction i */
            case (opcode(i))
                asgn: if (rhsClear (i, j))
                    case (opcode(j))
                            asgn: propagate (r, rhs(i), rhs(j)).
                        jcond, push, ret: propagate (r, rhs(i), exp(j)).
                        call: newRegArg (r, actArgList(j)).
                    end case
                end if
            pop: exp = popExpStk().
                case (opcode(j))
                    asgn: propagate (r, exp, rhs(j)).
                    jcond, push, ret: propagate (r, exp, exp(j)).
                    call: newRegArg (exp, actArgList(j)).
                end case
                call: case (opcode(j))
                asgn: rhs(j) = i.
                push, ret, jcond: exp(j) = i.
                call: newRegArg (i, actArgList(j)).
                end case
            end case
        end if
    end for
    if (opcode(i) == push) then
        pushExpStk (exp(i)).
    elsif (opcode(i) == call) and (invoked routine uses stack arguments) then
        pop arguments from the stack.
        place arguments on actual argument list.
        propagate argument type.
    end if
``` end for end for end procedure

Exemplary Trans-Compiler Tool Back End

The exemplary illustrative implementation transcompiler tool 504 provides target support for the C programming language. Other implementations could use other target source code support such as for example Javascript, Pascal, Visual Basic, Assembler or any desired source code format. The exemplary illustrative code generation C compiler and linker 508 may be very similar to traditional conventional compiler back ends. In one exemplary illustrative implementation, the HRTL is reduced to C code and the generated C code is provided to a GCC compiler/linker along with headers and libraries such as for example hardware libraries to create a final executable program. Retargeting the original object code to execute on a different target platform may use a Hardware Abstraction Layer. The interface between the Hardware Abstraction Layer and the application may be for example the registers and interrupts used by the original program on the original platform. The back-end of the Hardware Abstraction Layer may back-end interface to the target hardware. In one exemplary implementation the Hardware Abstraction Layer may be âcestubbed outâe to the original hardware so as to allow the original platform to be the new target. This can provide speed and performance optimization (i.e., in some instances the transcompiled version runs more efficiently than the original version).

Exemplary Software Interrupts

Software Interrupt instructions (SWIs) are used by the ARM and Thumb processors to emulate complex instruction sequences (i.e.: integer division, square root calculation, etc). The processor then changes mode to execute a series of instructions from ROM (Read-Only Memory). The instructions use a separate set of registers, so the original state of the processor remains undisturbed during this time. The instruction includes a 24-bit field in ARM mode and a 8-bit field in Thumb mode to distinguish the individual ROM sequences.

The GameBoy Advance (GBA) extended the capacity of the SWI instruction by adding several operations that are specific to the GBA. These operations include a decompression algorithm (LZ77), a Huffman decompression algorithm, several sequencing operations (Interrupt Wait), and graphics processing algorithms (BgAffineSet and ObjAffineSet). In our efforts to create a system that behaves in the same manner, we have translated these algorithms to C and compiled them as a separate library.

A Unified Machine Abstraction Interface library including sound, graphics, buttons, non-volatile memory, interrupts etc. may be used to provide the Hardware Abstraction Layer. Each Hardware Abstraction Layer should be customized to the particular target platform being used (i.e., there will be different Hardware Abstraction Layer libraries for different platforms).

Where original C source libraries are available, they may be included as standard C files. Otherwise, they will be generated from the original object files. ROM libraries may be translated in the normal manner and then linked as needed. The standard C headers for the target platform may be used by the compiler and linker to tie the application to the target platform. Standard C libraries may be linked as needed.

Traditional emulators may also be created using the libraries and techniques described above. Such emulators can be used for example to detect and identify hard to understand data objects such as those loaded at run time into the WRAM space. An Interrupt Replacement Unit may be used to replace C code in the recovered source to improve target hardware performance to avoid spin-locks for example. It is also possible to optimize performance by detecting wait times and recode waits into native calls, thereby avoiding spinlock waiting conditions. For example, one may want to recode virtual blanking wait tests into native function calls that do all the hardware events that happen up until the vertical blanking stage and then start the vertical blanking stage where the program resumes execution. It is also possible to take advantage of source platform detection of only a small subset of available software interrupt function calls to extend the software interrupt call set to include a wide array of hardware related stalls and code them into native calls. A common example would be a program waiting for a given horizontal blanking cycle to occur, which we can recode into different software interrupt calls depending on which registers are available. Since the tool generates a single C source code file in the exemplary illustrative implementation and it is typical for developers to use many C source code files, a higher level of optimization may be possible using the compiler techniques described herein due to the fact that the optimizing compiler will optimize over the entire (larger, common) source code file. Developers could achieve this same result by combining their source files into a single common file before final compilation. As compiler technology advances the recovered source can be recompiled with more advanced compilers.

Exemplary SWI Instructions and GBA Emulation

In our exemplary illustrative implementation, the GBA system should act in the same manner as the existing GameBoy Advance platform. To do this, we created a library for the existing set of software interrupt (SWI) instructions used in the GBA games. This library was written in C, so that it would be portable to other target platforms. The entry points to this new library in the exemplary illustrative implementation are compiled using SWI values that were not used in the original GBA ROM design.

Prior to the year 2000, a flaw was discovered in the ROM implementation of the GameBoy Advance sound routines. These functions were bypassed by adding the MusicPlayer 2000 music library to the GBA Software Development Kit (SDK).

While improving performance, we discovered that the MusicPlayer 2000 library was used repeatedly, generating several hundred ARM/Thumb instructions for every function call. We then analyzed the code in the MusicPlayer 2000 library, and replaced the entry points to the library functions with SWI instructions, calling target-independent C library functions. We then scanned each of the GBA games that we are deploying with our system, replacing the MusicPlayer 2000 libraries with SWI instructions.

We have continued to refine and extend this replacement process, substituting many complex series of instructions with a single SWI instruction, and creating a C library that executes the same operation. We have automated the process of identifying existing library entry points in our GBA games, and insert our SWI instructions prior to the deployment of the game.

Software development houses often use the same "engine" or the same set of libraries and algorithms between multiple games. We are exploiting this tendency by replacing these sections of common code with calls to our C libraries.

Since the number of sections of code will quickly exceed the number of available SWI instructions, we have modified our implementation. We now use an SWI instruction with the same value for any SWI in a particular game, and the OCHA system figures out which C library function to execute based on the current value of the program counter. This allows us to arbitrarily extend the list of known ARM/Thumb instructions that can be replaced by portable C library calls.

While the technology herein has been described in connection with exemplary illustrative non-limiting embodiments, the invention is not to be limited by the disclosure. For example, while Nintendo GAME BOY®, GAME BOY COLOR® and GAME BOY ADVANCE® platforms are used herein as examples, the technology herein could be used advantageously with any sort of computing, game or other platform. The invention is intended to be defined by the claims and to cover all corresponding and equivalent arrangements whether or not specifically disclosed herein.

We claim:

1. A method of porting a video game playable on a first platform so it can be played on a second platform different from said first platform, said first and second platforms having different video game hardware capabilities and each including hardware, the method comprising:

decompiling video game executable object code to provide decompiled source code;

removing, from said decompiled source code, at least one source code function associated with the first platform video game hardware capabilities that are not present in said second platform;

providing a hardware abstraction layer interfacing between hardware of the second platform and instructions that manipulate registers and use interrupts provided by the first platform;

recompiling said decompiled source code, minus said removed source code function, for the second platform, including compiling said decompiled source code into recompiled object code and linking said recompiled object code with the hardware abstraction layer and additional software providing said at least one function that was removed from said decompiled source code thereby providing a hardware abstraction layer that is customized to the second platform; and generating and executing a further video game executable from said linked recompiled object code to efficiently provide video game execution on the second platform.

2. The method of claim 1 wherein said decompiling comprises determining at least one entry point, disassembling each object code instruction and reinterpreting said instruction in a source code programming language.

3. The method of claim 2 wherein said source code programming language comprises C or C++.

4. The method of claim 2 wherein said source code programming language comprises JAVA.

5. The method of claim 1 wherein said decompiling includes examining data structures to define source code programming language data types.

6. A storage medium storing video game software playable on a video game system including user input controls and a display, said storage medium comprising:

a first storage area storing trans-compiled game code, said trans-compiled game code being produced by decompiling a video game executable object code to provide decompiled source code, removing from said decompiled source code at least one function associated with an original platform video game hardware capabilities that are not present in said system, and recompiling said resulting source code to provide executable object code that is compatible with said system; and a second storage area storing at least one hardware abstraction layer function native and customized to said video game system that can be used to efficiently implement said removed at least one function, said hardware abstraction layer interfacing between hardware of the video game system and instructions that manipulate registers and use interrupts provided by the original platform video game hardware capabilities;

wherein said storage medium further stores at least some information linking said trans-compiled game code with said hardware abstraction layer function to provide efficient video game execution and display.

7. A system for playing video games and other applications, said system comprising:

at least one processor;

a display coupled to said processor;

user input devices coupled to said processor; and at least one storage medium coupled to said processor, said storage medium including a first storage area storing trans-compiled video game object code produced by decompiling into source code a first binary executable previously compiled for an original platform, editing said source code including replacing function calls to at least one original platform library with function calls calling target-independent library functions that are more efficient than the original platform library functions the target-independent library functions replace, and recompiling said edited source code into a second binary executable for said at least one processor to execute, and a second storage area storing at least one run-time function supporting video game play, wherein said recompiled second binary executable is linked with said run-time function and said target-independent library functions, wherein said run-time function provides a hardware abstraction layer customized to said system that efficiently emulates video game hardware capabilities present on an original platform said video game was designed to run on, wherein the emulation performed by the hardware abstraction layer comprises interfacing between instructions that manipulate registers and use interrupts provided by the original platform hardware capabilities.

* * * * *